(12) United States Patent
Godala et al.

(10) Patent No.: US 12,407,545 B2
(45) Date of Patent: Sep. 2, 2025

(54) SPUR DETECTION, ESTIMATION, AND MITIGATION

(71) Applicant: QUALCOMM Incorporated, San Diego, CA (US)

(72) Inventors: Anirudh Reddy Godala, San Diego, CA (US); Yonghee Han, San Diego, CA (US); Jae Won Yoo, San Diego, CA (US); Omar Mehanna, San Diego, CA (US); Andreas Maximilian Schenk, Erlangen (DE); Hari Sankar, San Diego, CA (US); Christos Komninakis, Solana Beach, CA (US); Jing Jiang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/440,380

(22) Filed: Feb. 13, 2024

(65) Prior Publication Data

US 2025/0260602 A1    Aug. 14, 2025

(51) Int. Cl.
*H04L 25/03*        (2006.01)
(52) U.S. Cl.
CPC .............................. *H04L 25/03006* (2013.01)
(58) Field of Classification Search
CPC ................................................ H04L 25/03006
See application file for complete search history.

(56) References Cited

U.S. PATENT DOCUMENTS

| | | | |
|---|---|---|---|
| 8,451,918 B1 * | 5/2013 | Cheng | H04K 3/228 370/208 |
| 2023/0318765 A1 * | 10/2023 | Gutman | H04L 5/0062 370/329 |
| 2024/0205696 A1 * | 6/2024 | Gutman | H04W 24/10 |

* cited by examiner

*Primary Examiner* — Joseph D Torres
(74) *Attorney, Agent, or Firm* — Holland & Hart LLP

(57) ABSTRACT

Methods, systems, and devices for wireless communications are described. A user equipment (UE) may receive a demodulation reference signal (DMRS) and perform a filtering procedure on frequency-domain symbols of the DMRS to obtain a frequency-domain noise signal associated with the frequency-domain symbols. The UE may perform a spur detection procedure on the frequency-domain noise signal to detect one or more frequency spurs associated with the frequency-domain symbols. In addition, the UE may estimate a frequency of the frequency spurs. In some implementations, the UE may transmit information indicating spur parameters associated with the frequency spurs (e.g., including the estimated frequency) to a network entity. The UE may receive a control message indicating a rate matching pattern for subsequent communications, the rate matching pattern based on the spur parameters. The UE and the network entity may communicate according to the rate matching pattern.

30 Claims, 23 Drawing Sheets

SPUR DETECTION, ESTIMATION, AND MITIGATION

FIELD OF TECHNOLOGY

The following relates to wireless communications, including spur detection, estimation, and mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support spur detection, estimation, and mitigation. For example, the described techniques provide for demodulation reference signal (DMRS)-based spur detection and estimation. Some aspects include network-assisted spur handling through user equipment (UE) signaling. A UE may receive a DMRS via a channel and perform a filtering procedure on one or more frequency-domain symbols of the DMRS to obtain a frequency-domain noise signal associated with the symbols. The UE may use a spur detection procedure to detect one or more frequency spurs from the frequency-domain noise signal. Based on the spur detection procedure, the UE may estimate a frequency associated with the detected spurs such that the UE and a network entity may address (e.g., remove, mitigate, reduce) a frequency and a corresponding frequency spur for subsequent communications.

After performing the spur detection procedure and estimating the frequency, the UE may transmit information to the network entity indicating spur information (e.g., spur parameters including the frequency). In response, the network entity may output or transmit a message (e.g., a control message) indicating a rate matching pattern for subsequent communications. In some cases, the rate matching pattern may be based on the one or more spur parameters or spur information. The UE may communicate messages with the network entity according to the rate matching pattern.

A method for wireless communications by a UE is described. The method may include receiving a DMRS via a channel associated with the UE, generating a frequency domain noise signal associated with one or more frequency-domain symbols of the DMRS by performing, based on a channel estimation of the channel associated with the UE, a filtering procedure on the one or more frequency-domain symbols of the DMRS, detecting one or more frequency spurs associated with the one or more frequency-domain symbols by performing a spur detection procedure on the frequency domain noise signal, and estimating a frequency associated with the one or more frequency spurs based on the spur detection procedure.

A UE for wireless communications is described. The UE may include one or more memories storing processor executable code, and one or more processors coupled with the one or more memories. The one or more processors may individually or collectively be operable to execute the code to cause the UE to receive a DMRS via a channel associated with the UE, generate a frequency domain noise signal associated with one or more frequency-domain symbols of the DMRS by performing, based on a channel estimation of the channel associated with the UE, a filtering procedure on the one or more frequency-domain symbols of the DMRS, detecting one or more frequency spurs associated with the one or more frequency-domain symbols by performing a spur detection procedure on the frequency domain noise signal to, and estimate a frequency associated with the one or more frequency spurs based on the spur detection procedure.

Another UE for wireless communications is described. The UE may include means for receiving a DMRS via a channel associated with the UE, means for generating a frequency domain noise signal associated with one or more frequency-domain symbols of the DMRS by performing, based on a channel estimation of the channel associated with the UE, a filtering procedure on the one or more frequency-domain symbols of the DMRS, means for detecting one or more frequency spurs associated with the one or more frequency-domain symbols by performing a spur detection procedure on the frequency domain noise signal, and means for estimating a frequency associated with the one or more frequency spurs based on the spur detection procedure.

A non-transitory computer-readable medium storing code for wireless communications is described. The code may include instructions executable by one or more processors to receive a DMRS via a channel associated with the UE, generate a frequency domain noise signal associated with one or more frequency-domain symbols of the DMRS by performing, based on a channel estimation of the channel associated with the UE, a filtering procedure on the one or more frequency-domain symbols of the DMRS, detect one or more frequency spurs associated with the one or more frequency-domain symbols by performing a spur detection procedure on the frequency domain noise signal, and estimate a frequency associated with the one or more frequency spurs based on the spur detection procedure.

In some examples of the method, UEs, and non-transitory computer-readable medium described herein, detecting the one or more frequency spurs may include operations, features, means, or instructions for combining, for a set of multiple demodulation references signals received via the channel, a set of multiple frequency domain noise signals associated with the one or more frequency-domain symbols in a time-domain and detecting the one or more frequency spurs associated with the one or more frequency-domain symbols based on the combined frequency domain noise signal.

In some examples of the method, UEs, and non-transitory computer-readable medium described herein, detecting the one or more frequency spurs may include operations, features, means, or instructions for detecting the one or more frequency spurs associated with the one or more frequency-domain symbols based on a combined frequency domain noise signals satisfying a frequency threshold.

In some examples of the method, UEs, and non-transitory computer-readable medium described herein, estimating the frequency associated with the one or more frequency spurs may include operations, features, means, or instructions for determining a set of frequency-domain kernels or a set of time-domain kernels, where a range of frequencies associated with the set of frequency-domain kernels or a range of times associated with the set of time-domain kernels may be based on a subcarrier spacing centered around a frequency spur of the one or more frequency spurs, and where the set of frequency-domain kernels may be associated with a uniform spacing or a non-uniform spacing over the range of frequencies or the set of time-domain kernels may be associated with a uniform spacing or a non-uniform spacing over the range of times and estimating the frequency associated with the one or more frequency spurs based on one or more frequency-domain kernels of the set of frequency-domain kernels or one or more time-domain kernels of the set of time-domain kernels associated with the one or more frequency spurs.

In some examples of the method, UEs, and non-transitory computer-readable medium described herein, estimating the frequency associated with the one or more frequency spurs may include operations, features, means, or instructions for estimating, in accordance with a sampling function, a frequency associated with a frequency spur of the one or more frequency spurs based on an index associated with the frequency spur being within one index of a maximum frequency.

In some examples of the method, UEs, and non-transitory computer-readable medium described herein, estimating the frequency associated with the one or more frequency spurs may include operations, features, means, or instructions for transmitting information indicating one or more spur parameters that correspond to the one or more frequency spurs, where the one or more spur parameters includes the frequency.

Some examples of the method, UEs, and non-transitory computer-readable medium described herein may further include operations, features, means, or instructions for applying log-likelihood scaling to the frequency associated with the one or more frequency spurs based on the spur detection procedure.

In some examples of the method, UEs, and non-transitory computer-readable medium described herein, log-likelihood ratios associated with the frequency may be limited to a range based on one or more saturation values.

Some examples of the method, UEs, and non-transitory computer-readable medium described herein may further include operations, features, means, or instructions for applying a noise mitigation procedure to the DMRS based on the spur detection procedure, where the one or more frequency-domain symbols may be excluded from the noise mitigation procedure.

A method for wireless communications by a UE is described. The method may include transmitting information indicating one or more spur parameters that correspond to one or more frequency spurs associated with the UE, receiving, after transmission of the information, a control message indicating a rate matching pattern for one or more subsequent communications for the UE, where the rate matching pattern is based on the one or more spur parameters that correspond to the one or more frequency spurs associated with the UE, and communicating one or more messages in accordance with the rate matching pattern for the UE.

A UE for wireless communications is described. The UE may include one or more memories storing processor executable code, and one or more processors coupled with the one or more memories. The one or more processors may individually or collectively be operable to execute the code to cause the UE to transmit information indicating one or more spur parameters that correspond to one or more frequency spurs associated with the UE, receive, after transmission of the information, a control message indicating a rate matching pattern for one or more subsequent communications for the UE, where the rate matching pattern is based on the one or more spur parameters that correspond to the one or more frequency spurs associated with the UE, and communicate one or more messages in accordance with the rate matching pattern for the UE.

Another UE for wireless communications is described. The UE may include means for transmitting information indicating one or more spur parameters that correspond to one or more frequency spurs associated with the UE, means for receiving, after transmission of the information, a control message indicating a rate matching pattern for one or more subsequent communications for the UE, where the rate matching pattern is based on the one or more spur parameters that correspond to the one or more frequency spurs associated with the UE, and means for communicating one or more messages in accordance with the rate matching pattern for the UE.

A non-transitory computer-readable medium storing code for wireless communications is described. The code may include instructions executable by one or more processors to transmit information indicating one or more spur parameters that correspond to one or more frequency spurs associated with the UE, receive, after transmission of the information, a control message indicating a rate matching pattern for one or more subsequent communications for the UE, where the rate matching pattern is based on the one or more spur parameters that correspond to the one or more frequency spurs associated with the UE, and communicate one or more messages in accordance with the rate matching pattern for the UE.

Some examples of the method, UEs, and non-transitory computer-readable medium described herein may further include operations, features, means, or instructions for detecting one or more additional frequency spurs associated with the UE, transmitting second information indicating one or more second spur parameters that correspond to the one or more additional frequency spurs, and receiving, after transmission of the second information, a second control message indicating an updated rate matching pattern for the one or more subsequent communications for the UE, where the updated rate matching pattern may be based on the one or more second spur parameters.

In some examples of the method, UEs, and non-transitory computer-readable medium described herein, the second control message schedules one or more downlink messages in accordance with the updated rate matching pattern based on the one or more second spur parameters.

In some examples of the method, UEs, and non-transitory computer-readable medium described herein, the updated rate matching pattern may be based on one or more modulation and coding scheme (MCS) values associated with the one or more subsequent communications.

In some examples of the method, UEs, and non-transitory computer-readable medium described herein, transmitting the information may include operations, features, means, or instructions for transmitting a report including channel state feedback (CSF) and the information indicating the one or more spur parameters.

In some examples of the method, UEs, and non-transitory computer-readable medium described herein, transmitting the information may include operations, features, means, or instructions for transmitting a bitmap corresponding to the information indicating the one or more spur parameters, where the bitmap indicates one or more component carriers associated with the one or more frequency spurs.

In some examples of the method, UEs, and non-transitory computer-readable medium described herein, the information indicates a bandwidth part (BWP) index, a serving cell index, a frequency index, or any combination thereof associated with the one or more frequency spurs.

Some examples of the method, UEs, and non-transitory computer-readable medium described herein may further include operations, features, means, or instructions for transmitting the information indicating the one or more spur parameters that correspond to the one or more frequency spurs, where the one or more frequency spurs may be associated with one or more concurrent transmissions via a first frequency range (FR) and a second FR and receiving, after transmission of the information, downlink control information (DCI) indicating the rate matching pattern, a puncturing pattern, or both for the one or more concurrent transmissions, where the rate matching pattern, the puncturing pattern, or both may be based on the one or more spur parameters.

In some examples of the method, UEs, and non-transitory computer-readable medium described herein, the information includes a frequency associated with the one or more frequency spurs, a location associated with the one or more frequency spurs, a type of the one or more frequency spurs, or any combination thereof and the type may indicate a static spur, a dynamic spur, or a lack of spurs.

In some examples of the method, UEs, and non-transitory computer-readable medium described herein, transmitting the information may include operations, features, means, or instructions for transmitting a MAC-CE indicating the one or more spur parameters.

Some examples of the method, UEs, and non-transitory computer-readable medium described herein may further include operations, features, means, or 'MAC-CE that requests the information indicating the one or more spur parameters from the UE.

Some examples of the method, UEs, and non-transitory computer-readable medium described herein may further include operations, features, means, or instructions for detecting the one or more frequency spurs associated with the UE by performing a spur detection procedure on a frequency domain noise signal, estimating a frequency associated with the one or more frequency spurs based on the spur detection procedure, and transmitting the information indicating the one or more spur parameters based on the spur detection procedure and the frequency.

A method for wireless communications by a network entity is described. The method may include obtaining information indicating one or more spur parameters that correspond to one or more frequency spurs associated with a UE, outputting, after reception of the information, a control message indicating a rate matching pattern for one or more subsequent communications for the UE, where the rate matching pattern is based on the one or more spur parameters that correspond to the one or more frequency spurs associated with the UE, and obtaining or outputting one or more messages in accordance with the rate matching pattern for the UE.

A network entity for wireless communications is described. The network entity may include one or more memories storing processor executable code, and one or more processors coupled with the one or more memories. The one or more processors may individually or collectively be operable to execute the code to cause the network entity to obtain information indicating one or more spur parameters that correspond to one or more frequency spurs associated with a UE, output, after reception of the information, a control message indicating a rate matching pattern for one or more subsequent communications for the UE, where the rate matching pattern is based on the one or more spur parameters that correspond to the one or more frequency spurs associated with the UE, and obtain or output one or more messages in accordance with the rate matching pattern for the UE.

Another network entity for wireless communications is described. The network entity may include means for obtaining information indicating one or more spur parameters that correspond to one or more frequency spurs associated with a UE, means for outputting, after reception of the information, a control message indicating a rate matching pattern for one or more subsequent communications for the UE, where the rate matching pattern is based on the one or more spur parameters that correspond to the one or more frequency spurs associated with the UE, and means for obtaining or outputting one or more messages in accordance with the rate matching pattern for the UE.

A non-transitory computer-readable medium storing code for wireless communications is described. The code may include instructions executable by one or more processors to obtain information indicating one or more spur parameters that correspond to one or more frequency spurs associated with a UE, output, after reception of the information, a control message indicating a rate matching pattern for one or more subsequent communications for the UE, where the rate matching pattern is based on the one or more spur parameters that correspond to the one or more frequency spurs associated with the UE, and obtain or output one or more messages in accordance with the rate matching pattern for the UE.

Some examples of the method, network entities, and non-transitory computer-readable medium described herein may further include operations, features, means, or instructions for obtaining second information indicating one or more second spur parameters that correspond to one or more additional frequency spurs and outputting, after reception of the second information, a second control message indicating an updated rate matching pattern for the one or more subsequent communications for the UE, where the updated rate matching pattern may be based on the one or more second spur parameters.

In some examples of the method, network entities, and non-transitory computer-readable medium described herein, the second control message schedules one or more downlink messages in accordance with the updated rate matching pattern based on the one or more second spur parameters.

In some examples of the method, network entities, and non-transitory computer-readable medium described herein, the updated rate matching pattern may be based on one or more MCS values associated with the one or more subsequent communications.

In some examples of the method, network entities, and non-transitory computer-readable medium described herein, receiving the information may include operations, features, means, or instructions for obtaining a report including CSF and the information indicating the one or more spur parameters.

In some examples of the method, network entities, and non-transitory computer-readable medium described herein, receiving the information may include operations, features, means, or instructions for obtaining a bitmap corresponding to the information indicating the one or more spur parameters, where the bitmap indicates one or more component carriers associated with the one or more frequency spurs.

In some examples of the method, network entities, and non-transitory computer-readable medium described herein, the information indicates a BWP index, a serving cell index, a frequency index, or any combination thereof associated with the one or more frequency spurs.

Some examples of the method, network entities, and non-transitory computer-readable medium described herein may further include operations, features, means, or instructions for obtaining the information indicating the one or more spur parameters that correspond to the one or more frequency spurs, where the one or more frequency spurs may be associated with one or more concurrent transmissions via a first FR and a second FR and outputting, after reception of the information, DCI indicating the rate matching pattern, a puncturing pattern, or both for the one or more concurrent transmissions, where the rate matching pattern, the puncturing pattern, or both may be based on the one or more spur parameters.

In some examples of the method, network entities, and non-transitory computer-readable medium described herein, the information includes a frequency associated with the one or more frequency spurs, a location associated with the one or more frequency spurs, a type of the one or more frequency spurs, or any combination thereof and the type may indicate a static spur, a dynamic spur, or a lack of spurs.

In some examples of the method, network entities, and non-transitory computer-readable medium described herein, receiving the information may include operations, features, means, or instructions for obtaining a MAC-CE indicating the one or more spur parameters.

Some examples of the method, network entities, and non-transitory computer-readable medium described herein may further include operations, features, means, or instructions for outputting a MAC-CE that requests the information indicating the one or more spur parameters from the UE.

DETAILED DESCRIPTION

Figure 1:
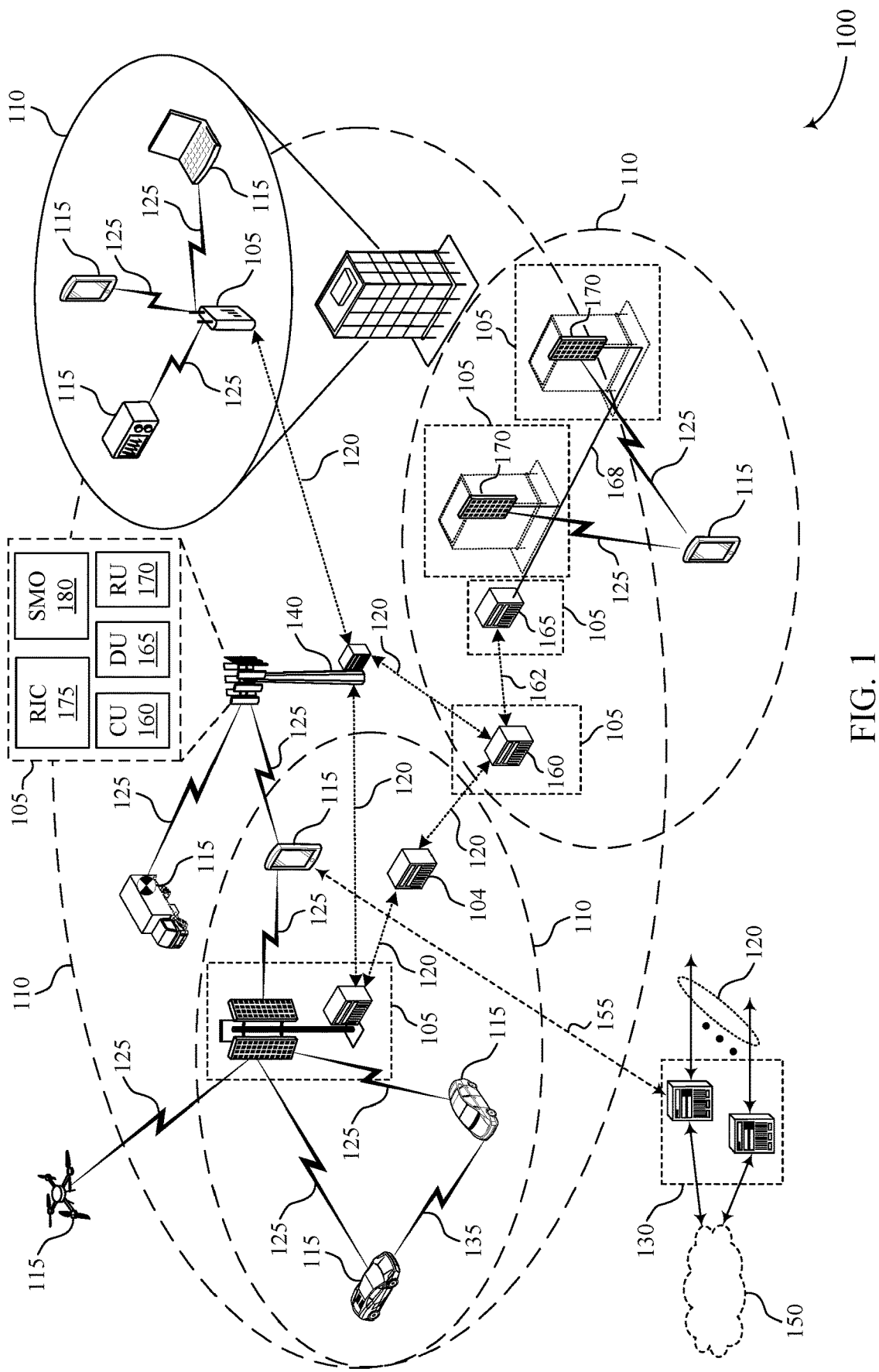
FIG. 1 shows an example of a wireless communications system that supports spur detection, estimation, and mitigation in accordance with one or more aspects of the present disclosure.

Frequency spurs may be frequency components of received signals (e.g., demodulation reference signals (DMRSs)) based on hardware limitations of a wireless device (e.g., user equipment (UE)). In some examples, a UE may detect static frequency spurs, which may be active and have a near-constant impact on the UE's performance over time. For example, static frequency spurs may be associated with a same frequency over time due to the hardware components of the UE, which may be accounted for through static or fixed parameters configured to address such static spurs. However, some signals, such as DMRSs, may also be subjected to or may include dynamic frequency spurs, which may be active or inactive over time (e.g., may vary over time). If the UE fails to detect and report information about such dynamic frequency spurs, a network entity may be unable to avoid similar frequency spurs in future transmissions. Accordingly, the UE may experience performance degradation based on the quantity of frequency spurs detected as well as corresponding power levels or frequencies (e.g., channels or subchannels) of the frequency spurs. Techniques for handling frequency spurs may include estimating a frequency, magnitude, and phase of a frequency spur over a duration of time. However, the values of these parameters for dynamic frequency spurs may be inconsistent over time, which may limit these techniques from reducing the impact of residual frequency spurs in the signal.

The techniques describes herein support frequency spur detection, frequency spur estimation, and mitigation of the performance impact caused by the frequency spurs (e.g., static or dynamic frequency spurs). For example, a UE may support techniques for DMRS-based spur detection and estimation to handle dynamic spurs. A UE may receive a DMRS via a channel and perform a filtering procedure on one or more frequency-domain symbols of the DMRS to obtain a frequency-domain noise signal associated with the symbols. The filtering procedure may be based on a channel estimation of the channel. In some examples, the UE may use a spur detection procedure to detect one or more frequency spurs from the frequency-domain noise signal. Based on the spur detection procedure, the UE may estimate a frequency associated with the detected spurs such that the UE and a network entity may address (e.g., remove, mitigate, prevent) a frequency and corresponding frequency spur(s) for subsequent communications.

Additionally, the UE may support techniques for network-assisted spur handling based on signaling from the UE. For example, after performing the spur detection procedure and estimating the frequency, the UE may transmit information to the network entity indicating spur information (e.g., spur parameters). In response, the network entity may output or transmit a control message (e.g., a radio resource control (RRC), medium access control (MAC) control element (MAC-CE), or a downlink control information (DCI) message) indicating a rate matching pattern for subsequent communications, where the rate matching pattern is based on the one or more spur parameters. The UE may communicate messages with the network entity according to the rate matching pattern. In some examples, the UE may detect a dynamic frequency spur and transmit corresponding information to the network entity, the information including one or more additional spur parameters corresponding to the detected frequency spur. Based on the information, the network entity may output a control message to the UE indicating a new or updated rate matching pattern based on the additional spur parameters and providing scheduling information to the UE.

Aspects of the disclosure are initially described in the context of wireless communications systems. Aspects of the disclosure are then described in the context of frequency spur detection and estimation procedures, DMRS symbols, and process flows. Aspects of the disclosure are further illustrated by and described with reference to apparatus diagrams, system diagrams, and flowcharts that relate to spur detection, estimation, and mitigation.

FIG. 1 shows an example of a wireless communications system 100 that supports spur detection, estimation, and mitigation in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may refer to resources of one symbol period (e.g., a duration of one modulation symbol) and one subcarrier, in which case the symbol period and subcarrier spacing may be inversely related. The quantity of bits carried by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

A UE 115 and a network entity 105 may communicate signals that may include frequency spurs. Frequency spurs may be frequency components of received signals (e.g., DMRSs and other reference signals) as a result of intermodulation between oscillator signals at RF frontends. For example, sources of frequency spurs may include anomalous interleaving in analog-to-digital converters (ADCs) and oscillator clock leakage, among other sources. A signal that includes a frequency spur may be modeled as $$r(n) = s(n) + w(n) + \sum_{i=1}^{N_{spur}} \alpha_i e^{j\omega_i n},$$

s(n) may represent an actual signal component at a receiver (e.g., a DMRS component of a DMRS signal), and w(n) may represent a noise component at the receiver (e.g., frequency-domain noise signal). In addition, $N_{spur}$ may represent a total quantity of frequency spurs in the signal, and w; may represent a frequency of an ith frequency spur. In a frequency domain, a frequency spur may be represented by a spike (e.g., at a single frequency), or the frequency spur may be spread over multiple frequencies or tones.

If the UE 115 and the network entity 105 fail to cancel or remove frequency spurs from a signal, the wireless devices may experience performance degradation at a peak modulation and coding scheme (MCS). The amount of performance degradation may depend on a quantity of frequency spurs, as well as frequencies and power associated with the frequency spurs. For example, as the quantity of frequency spurs increases or the power associated with the frequency spurs increases, the performance degradation may increase. The UE 115-b may maintain an RF database (e.g., RF CHAR) of known frequency spurs based on the UE's hardware. In some examples, such performance degradation may occur if frequency spurs are missed or unreported in the RF database (e.g., thus, uncanceled). As such, techniques may be desired for online frequency spur detection to cancel dynamic spurs and improve performance.

Some techniques for handling frequency spurs may include estimating a frequency, magnitude, and phase of a frequency spur from a signal and cancelling that frequency spur (e.g., spurLIC). However, estimating these parameters accurately may require filtering over a long duration of time, and continuity in the values of the frequency, magnitude, and phase may vary over time due to dynamic slots or frequent uplink and downlink slot switches. In addition performance during a transient period (e.g., before filter convergence) may be limited by estimation errors and may form a bottleneck to overall throughput. Therefore, residual frequency spurs may impact communications.

The wireless communications system 100 may support DMRS-based spur detection and estimation and network-assisted spur handling through UE signaling. A UE 115 may receive a DMRS via a channel and perform a filtering procedure on one or more frequency-domain symbols of the DMRS to obtain a frequency-domain noise signal associated with the symbols. The UE 115 may use a spur detection procedure to detect one or more frequency spurs from the frequency-domain noise signal. Based on the spur detection procedure, the UE 115 may estimate a frequency associated with the detected spurs such that the UE 115 and a network entity 105 may address (e.g., remove) the frequency and corresponding frequency spur for subsequent communications.

After performing the spur detection procedure and estimating the frequency, the UE 115 may transmit information to the network entity 105 indicating spur information (e.g., spur parameters including the frequency). In response, the network entity 105 may output a control message (e.g., a message) indicating a rate matching pattern for subsequent communications, the rate matching pattern based on the one or more spur parameters. The UE 115 may communicate messages with the network entity 105 according to the rate matching pattern.

Figure 2:
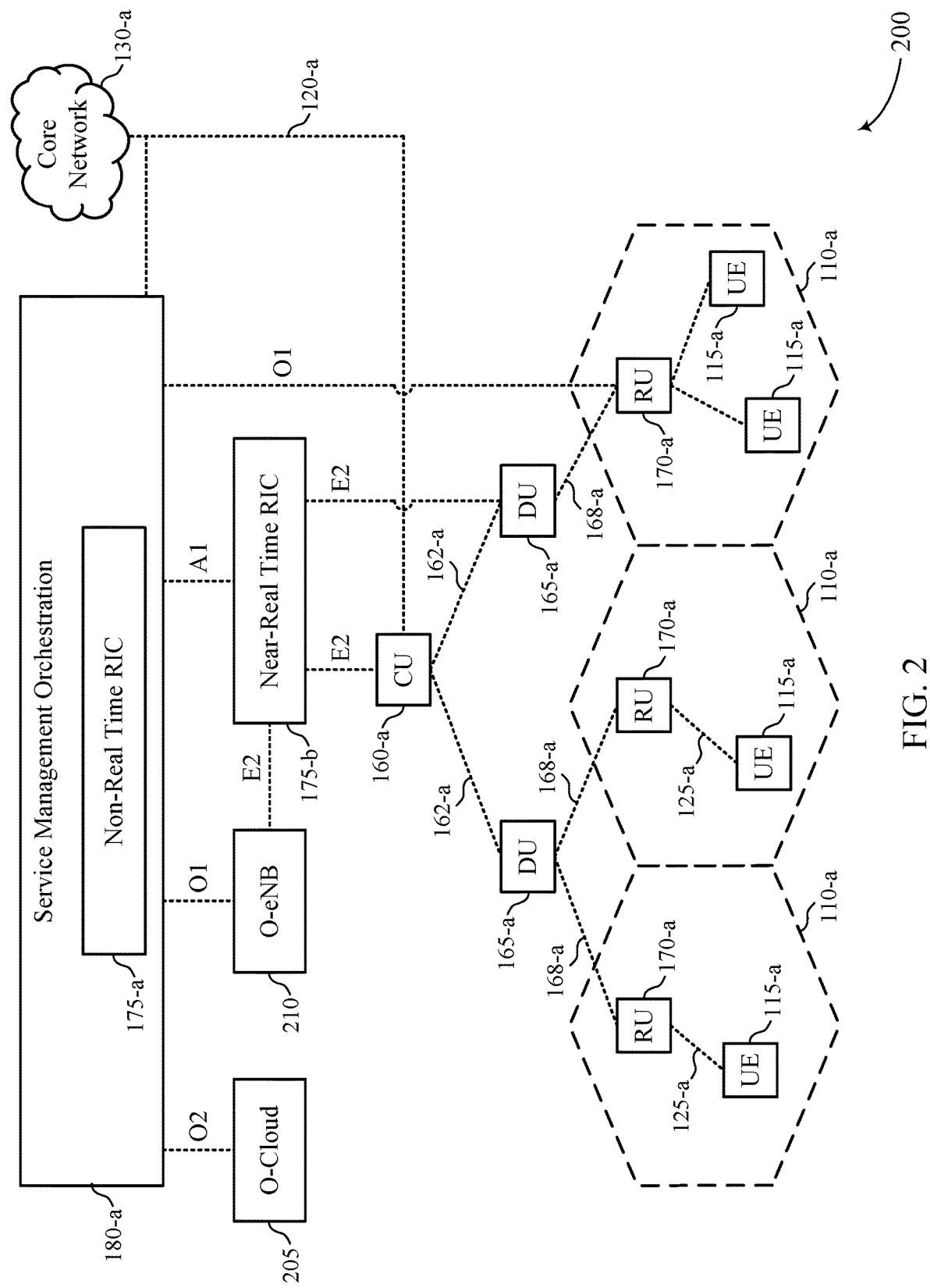
FIG. 2 shows an example of a network architecture that supports spur detection, estimation, and mitigation in accordance with one or more aspects of the present disclosure.

FIG. 2 shows an example of a network architecture 200 (e.g., a disaggregated base station architecture, a disaggregated RAN architecture) that supports spur detection, estimation, and mitigation in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

The network architecture 200 may support DMRS-based spur detection and estimation and network-assisted spur handling through UE signaling. A UE 115-a may receive a DMRS via a channel and perform a filtering procedure on one or more frequency-domain symbols of the DMRS to obtain a frequency-domain noise signal associated with the symbols. The UE 115-a may use a spur detection procedure to detect one or more frequency spurs from the frequency-domain noise signal. Based on the spur detection procedure, the UE 115-a may estimate a frequency associated with the detected spurs such that the UE 115-a and a network entity 105 may address (e.g., remove) the frequency and corresponding frequency spur for subsequent communications.

After performing the spur detection procedure and estimating the frequency, the UE 115-a may transmit information to the network entity 105 indicating spur information (e.g., spur parameters including the frequency). In response, the network entity 105 may output a control message (e.g., a message) indicating a rate matching pattern for subsequent communications, the rate matching pattern based on the one or more spur parameters. The UE 115-a may communicate messages with the network entity 105 according to the rate matching pattern.

Figure 3:
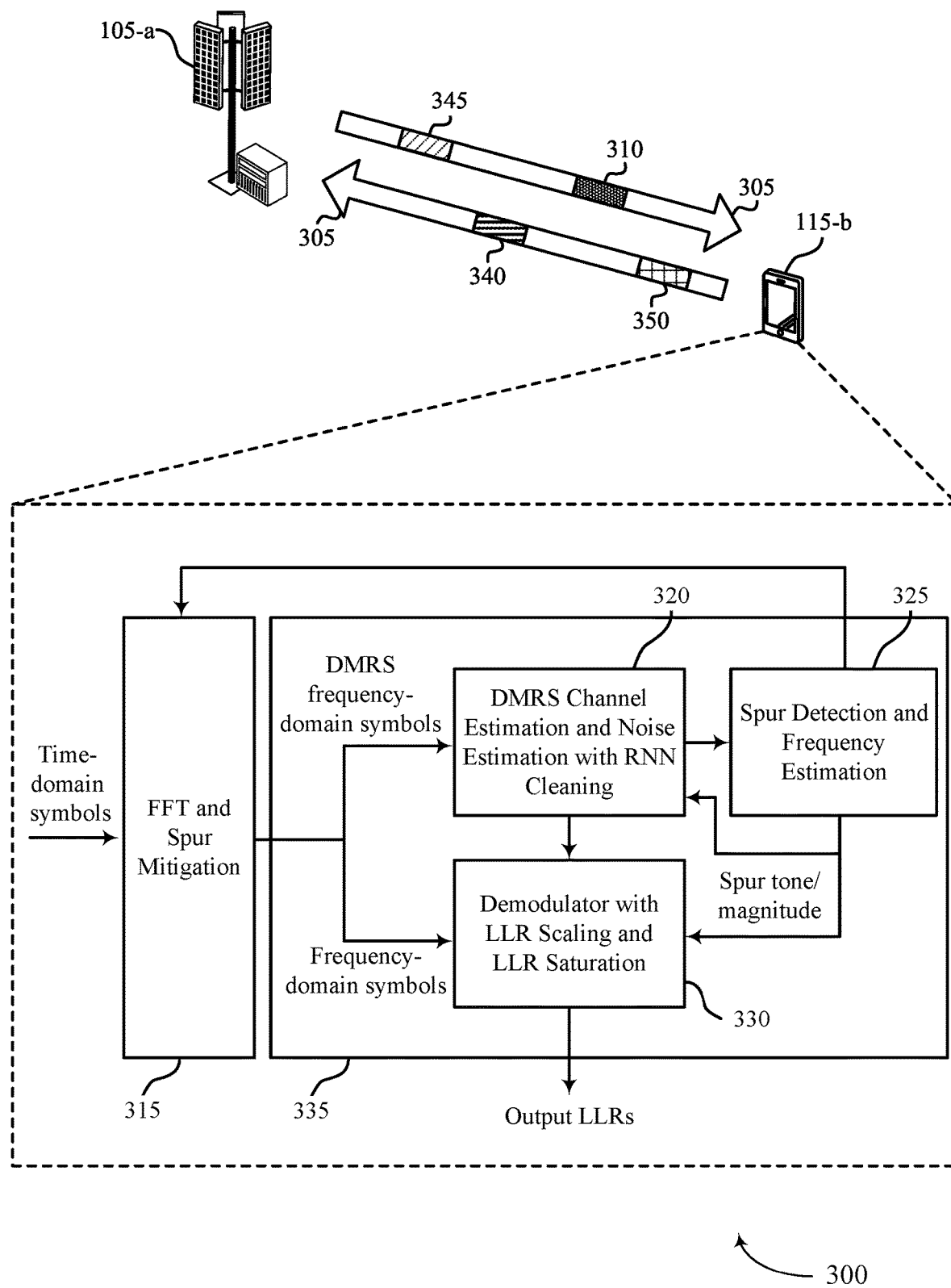
FIG. 3 shows an example of a wireless communications system that supports spur detection, estimation, and mitigation in accordance with one or more aspects of the present disclosure.

FIG. 3 shows an example of a wireless communications system 300 that supports spur detection, estimation, and mitigation in accordance with one or more aspects of the present disclosure. In some examples, the wireless communications system 300 may implement aspects of the wireless communications system 100 and the network architecture 200 or may be implemented by aspects of the wireless communications system 100 and the network architecture 200. For example, the wireless communications system 300 may include a UE 115-b and a network entity 105-a (e.g., a base station, a gNB), which may be examples of corresponding devices described herein. The UE 115-b and the network entity 105-a may support frequency spur detection, estimation, and mitigation to reduce the effect of frequency spurs on signals such as DMRSs.

The wireless communications system 300 may support communications between the UE 115-b and the network entity 105-a. For example, the UE 115-b and the network entity 105-a may communicate uplink and downlink messages via respective communication links 305, which may examples of a communication link 125 described herein with reference to FIG. 1. In some examples, the UE 115-b and the network entity 105-a may support methods for handling frequency spurs (e.g., static and dynamic frequency spurs) and mitigating the effects of residual frequency spurs. That is, using UE baseband processing 335 or network-assisted handling, as described herein, to perform frequency spur detection and estimation procedures, the UE 115-b may improve demodulation performance.

In some implementations, the UE 115-b may support DMRS-based online spur detection and estimation to manage dynamic spurs. For example, the UE 115-b may receive a DMRS 310 via a channel associated with the UE 115-b (e.g. a dedicated channel). In some examples, the UE 115-b may receive the DMRS 310 via one or more time-domain symbols and apply an FFT as part of an FFT and spur mitigation procedure 315 to convert the time-domain symbols into the one or more frequency-domain symbols. Also as a part of the FFT and spur mitigation procedure 315, the UE 115-b may perform some spur mitigation procedure (e.g., spurLIC) on any static frequency spurs that are known to the UE 115-b from the frequency-domain symbols. For example, the UE 115-b may identify and mitigate (e.g., remove) static frequency spurs that had previously been reported and stored at the UE 115-b.

In some examples, the UE 115-b may use the frequency-domain symbols of the DMRS 310 to perform DMRS channel estimation and noise estimation 320. For example, the UE 115-b may perform a channel estimation of the channel and based on the channel estimation, perform a filtering procedure on the one or more frequency-domain symbols of the DMRS 310. The UE 115-b may use the filtering procedure to obtain a frequency-domain noise signal associated with the frequency-domain symbols, where the frequency-domain noise signal may include signal noise and in some cases, one or more frequency spurs. In some examples, the UE 115-b may apply RRN cleaning to the frequency-domain noise signal to mitigate the effects of any residual static frequency spurs at this stage.

The UE 115-b may use the frequency-domain noise signal to perform spur detection and frequency estimation 325. For example, the UE 115-b may perform a spur detection procedure on the frequency-domain noise signal to detect one or more frequency spurs (e.g., dynamic frequency spurs previously unknown to the UE 115-b). The spur detection procedure may include detecting the one or more frequency spurs based on comparing the frequency-domain noise signal to a frequency threshold. In addition, the UE 115-b may estimate a frequency associated with the detected frequency spurs based on the spur detection procedure The filtering procedure, the spur detection procedure, and the frequency estimation are described herein with reference to FIGS. 4 and 5.

Once the UE 115-b has detected the frequency spurs and estimated the associated frequencies, the UE 115-b may feedback that information back to a component that manages the FFT and spur mitigation procedure 315 such that the UE 115-b may preemptively cancel the same frequency spurs from subsequent DMRSs. In addition, the UE 115-b may feedback information such as a tone (e.g., the frequency) and a magnitude associated with a detected frequency spur such that this information may be used in future DMRS channel estimation and noise estimation 320 and demodulation 330 to further improve frequency spur mitigation.

The UE 115-b may perform additional baseband processing 335 with the demodulation 330 to mitigate the impact of residual frequency spurs. For example, the UE 115-b may perform log-likelihood ratio (LLR) scaling (e.g., log-likelihood scaling), recurrent neural network (RNN) cleaning (e.g., a noise mitigation procedure), LLR saturation, or some combination thereof. The UE 115-b may output one or more LLRs corresponding to the detected frequency spurs after applying the baseband processing 335, where the UE 115-b may use the LLRs for decoding a codeword.

In some examples, the UE 115-b may use LLR scaling to mitigate the impact of the detected frequency spurs and residual frequency spurs on demodulation performance. LLRs may be scaled for the frequency spur-impacted frequencies (e.g., tones) and adjacent frequencies to reduce the impact of those frequencies during decoding. For example, the UE 115-b may scale the frequency-spur-impacted frequencies and two adjacent frequencies (e.g., three frequencies total). The UE 115-b may determine scaling coefficients based on frequency spur level, spur location, and other factors such as signal-to-noise ratio (SNR), MCS, or other factors. In addition, different scaling may be applied for spur frequencies and adjacent frequencies. For example, the UE 115-b may apply LLR scaling $llr[i]=a_1 \cdot llr[i]$ to the spur frequency (e.g., i), LLR scaling $llr[i+1]=a_2 \cdot llr[i+1]$ to an adjacent spur frequency (e.g., i+1), and LLR scaling $llr[i-1]=a_3 \cdot llr[i-1]$ to an adjacent spur frequency (e.g., i-1). The UE 115-b may apply the LLR scaling over any quantity of adjacent frequencies.

In some implementations, as a quantity of LLRs may impact the performance of channel decoding, and as residual spurs may impact these LLRs, the UE 115-b may perform LLR saturation to limit or clip the LLRs associated with spur-impacted frequencies in a particular range. This may reduce the significance of the spur-impacted frequencies in channel decoding. The UE 115-b may apply the LLR saturation only to the spur-impacted frequencies, such that LLR=clip (LLR, sat) may limit LLR saturation values within a range [-sat, sat](e.g., saturation values may include 3, 7, and 15, among other values). In this way, the LLRs associated with a given frequency associated with a frequency spur may be limited to a range based on one or more LLR saturation values. Using the LLR scaling with LLR saturation may improve robustness to error while the UE 115-b selects scaling factors (e.g., prevent against incorrect estimates of spur power). As such, the UE 115-b may use LLR saturation to improve the robustness of the system and reduce estimation errors. If the UE 115-b performs optimal LLR scaling, the LLR saturation may make no impact on the LLR scaling. In addition, the LLR saturation may have a minimal impact on any frequency spurs that are falsely detected (e.g., false alarm spurs).

The UE 115-b may additionally, or alternatively, apply RNN cleaning (e.g., a noise mitigation procedure) during the DMRS channel estimation and noise estimation 320. The UE 115-b may compute the RNN using a noise estimation block of a de-mapper module to estimate noise covariance. That is, the UE 115-b may use the RNN for interference handling. The UE 115-b may perform RNN estimation in the frequency domain, where the RNN is averaged over a size of a physical resource group (PRG) to improve its quality (e.g., using the function $Rnn=E(|Y-HX|2)$). Incorrect RNN estimates may cause significant degradation in performance. In some examples, residual frequency spurs may impact the RNN computation, thereby reducing demodulation performance. To mitigate this, the UE 115-b may perform RNN cleaning or nulling, during which the UE 115-b may exclude (e.g., ignore) spur-impacted frequencies from RNN averaging (e.g., the noise mitigation procedure). and instead adjust some scaling factors for the averaging. The spur-impacted frequencies may include frequencies where a frequency spur is present and adjacent frequencies. Alternatively, the UE 115-*b* may perform RNN averaging across the PRG using a scaled version spur-impacted frequencies.

In addition, the UE 115-*b* may support network-assisted spur handling based on communications with the network entity 105-*a*. For example, after detecting the frequency spurs and estimating the corresponding frequency, the UE 115-*b* may transmit information 340 to the network entity 105-*a* indicating spur parameters corresponding to the frequency spurs previously detected. The spur information may indicate a frequency location, power, and spur type (e.g., dynamic, static, or no spurs) associated with the detected frequency spurs. In some examples, the UE 115-*b* may transmit the information 340 via uplink channels such as physical uplink shared channels (PUCCH), physical uplink control channels (PUSCH), and sidelink channels, among other uplink channels. In addition, the UE 115-*b* may transmit the information 340 to the network entity 105-*a* during an RRC connection procedure or anytime later while RRC connected with the network entity 105-*a*.

In some examples, the information 340 may be associated with static frequency spurs, which may be always active and primarily the result of hardware jitters. The effects of static frequency spurs on communications between the UE 115-*b* and the network entity 105-*a* may be near-constant over time. For example, for a given BWP, the location (e.g., resource block (RB) and resource element (RE) indices) of the static frequency spurs may remain constant throughout a transmission. The UE 115-*b* may report the information 340 to the network entity 105-*a* once for static spurs as the information 340 may remain unchanged unless the UE 115-*b* switches or changes the corresponding BWP.

Using the information 340 obtained from the UE 115-*b*, the network entity 105-*a* may transmit a control message 345 to the UE 115-*b* indicating a rate matching pattern for subsequent communications 350 with the UE 115-*b*. The network entity 105-*a* may schedule physical downlink shared channel (PDSCH) or physical downlink control channel (PDCCH) transmissions with the rate matching pattern based on the information 340, such that the rate matching pattern avoids frequency spur-impacted REs. This may assist the UE 115-*b* in improving its demodulation performance. In some examples, the control message 345 may include RRC signaling, and the network entity 105-*a* may configure the rate matching pattern through an RRC information element RateMatchPatternGroup. That is, the network entity 105-*a* may use RateMatchPatternGroup to configure the rate matching pattern based on static frequency spurs. In some examples, the network entity 105-*a* may use MAC-CE signaling to activate or deactivate rate matching patterns to handle the frequency spurs. The UE 115-*b* and the network entity 105-*a* may perform the subsequent communications 350 according to the rate matching pattern and reduce the impacts of the frequency spurs.

In some examples, the UE 115-*b* may detect one or more dynamic frequency spurs using the spur detection procedure as described herein. Unlike static frequency spurs, dynamic frequency spurs may sometimes be inactive, and may be the result of intermodulation between oscillator signals at RF frontends of the UE 115-*b*. The UE 115-*b* may regularly update spur information related to dynamic frequency spurs transmitted to the network entity 105-*b* as the effects of the dynamic frequency spurs on the subsequent communications 350 may change over time. Thus, the UE 115-*b* may utilize more dynamic signaling to handle dynamic frequency spurs. The UE 115-*b* may transmit MAC-CE-based signaling or periodic channel state feedback (CSF) reports and similar reporting frameworks to transmit the dynamic spur information to the network entity 105-*a*. Regardless of whether the frequency spurs are static or dynamic, the UE 115-*b* may use the same reporting scheme or framework and specify the type of frequency spur (e.g., static or dynamic).

In some examples, the network entity 105-*a* may trigger the UE 115-*b* to report the spur information periodically, semi-persistently, or dynamically. For example, the network entity 105-*a* may transmit a MAC-CE to the UE 115-*b* requesting the information 340. In cases of downlink carrier aggregation, the UE 115-*b* may jointly report the information 340 for multiple frequency spurs across multiple component carriers (CCs) if the CCs share a same RF chain. Alternatively, the UE 115-*b* may independently report the information 340 for multiple frequency spurs across different CCs. For example, for joint reporting, the UE 115-*b* may use a bitmap to indicate the information 340 for multiple frequency spurs and indicate corresponding CCs the frequency spurs impact.

Alternatively, the UE 115-*b* may report the information 340 via MAC-CE signaling (e.g., as MAC-CE signaling enables a fast communication exchange without involving higher layers). Such MAC-CE signaling may carry control information and thus enable the exchange of control commands between the UE 115-*b* and the network entity 105-*a*, specifically for managing various aspects of the communications (instead of for transmitting data traffic). The UE 115-*b* may identify MAC-CE commands via logical channel identifier (LCID) values for uplink and downlink communications. Accordingly, the UE 115-*b* may use control elements (e.g., MAC-CE) to report the information 340 (e.g., including the static or dynamic nature of the corresponding frequency spur) and other control elements to update the information 340 as required.

In addition, to report a transmit direct current (DC) location per serving cell and for each configured uplink BWP, the UE 115-*b* may utilize an UplinkTxDirectCurrentList information element in RRC signaling. The UE 115-*b* may leverage a similar reporting structure to report the information 340 to the network entity 105-*b*. The information 340 may indicate a BWP index, a serving cell index, a frequency index, or any combination thereof associated with the frequency spurs.

Based on obtaining the dynamic spur information from the UE 115-*b* relating to one or more dynamic frequency spurs, the network entity 105-*a* may update the rate matching pattern via RateMatchPatternGroup and RRC signaling. For example, the network entity 105-*a* may configure one or more rate matching groups (e.g., via a RateMatchGroups information element) and enable the rate matching groups for the subsequent communications 350 using dynamic signaling such as DCI or MAC-CE signaling. Additionally, or alternatively, the network entity 105-*a* may update frequency-domain resource allocations for the subsequent communications 350 via DCI or a MAC-CE-based update. For example, the network entity 105-*a* may use DCI to schedule a PDSCH with Type0 resource mapping (e.g., a Type-0 bitmap-based allocation for the frequency domain) to avoid or ignore REs impacted by the frequency spurs. In some examples, the network entity 105-*a* may enable the spur-specific rate matching patterns based on MCS values associated with the subsequent communications 350. If the UE 115-*b* detects that dynamic frequency spurs are no longer in effect, the UE 115-*b* may indicate such information to then network entity 105-*a* (e.g., by indicating a frequency spur type as "no spurs"). The network entity 105-*a* may update the frequency-domain allocations and rate matching pattern accordingly.

In some examples, the UE 115-*b* and the network entity 105-*b* may support concurrent transmissions in different FRs (e.g., FR1 and FR2). Regarding concurrent transmissions, dynamic frequency spurs may appear in particular locations. Based on detecting one or more frequency spurs associated with concurrent transmissions using the spur detection procedure, the UE 115-*b* may report additional spur information associated with these frequency spurs. In addition to the spur parameters, the UE 115-*b* may indicate a nature and source of the frequency spurs (e.g., concurrent transmissions) using reporting frameworks such as a MAC-CE, a CSF report, and other reporting frameworks. The network entity 105-*a* may leverage the reported spur information for scheduling the subsequent communications 350. If the network entity 105-*a* may use dynamic signaling (e.g., DCI) to schedule concurrent transmissions as part of the subsequent communications 350, the network entity 105-*a* may specify rate matching or puncturing to avoid the spur-impacted REs. If using a DCI indication, the network entity 105-*a* may specify the rate matching or puncturing using a single bit. In this way, the network entity 105-*a* may rate match the spur-impacted locations (e.g., REs and RBs) to reduce the impact of the frequency spurs on the subsequent communications 350.

Figure 4:
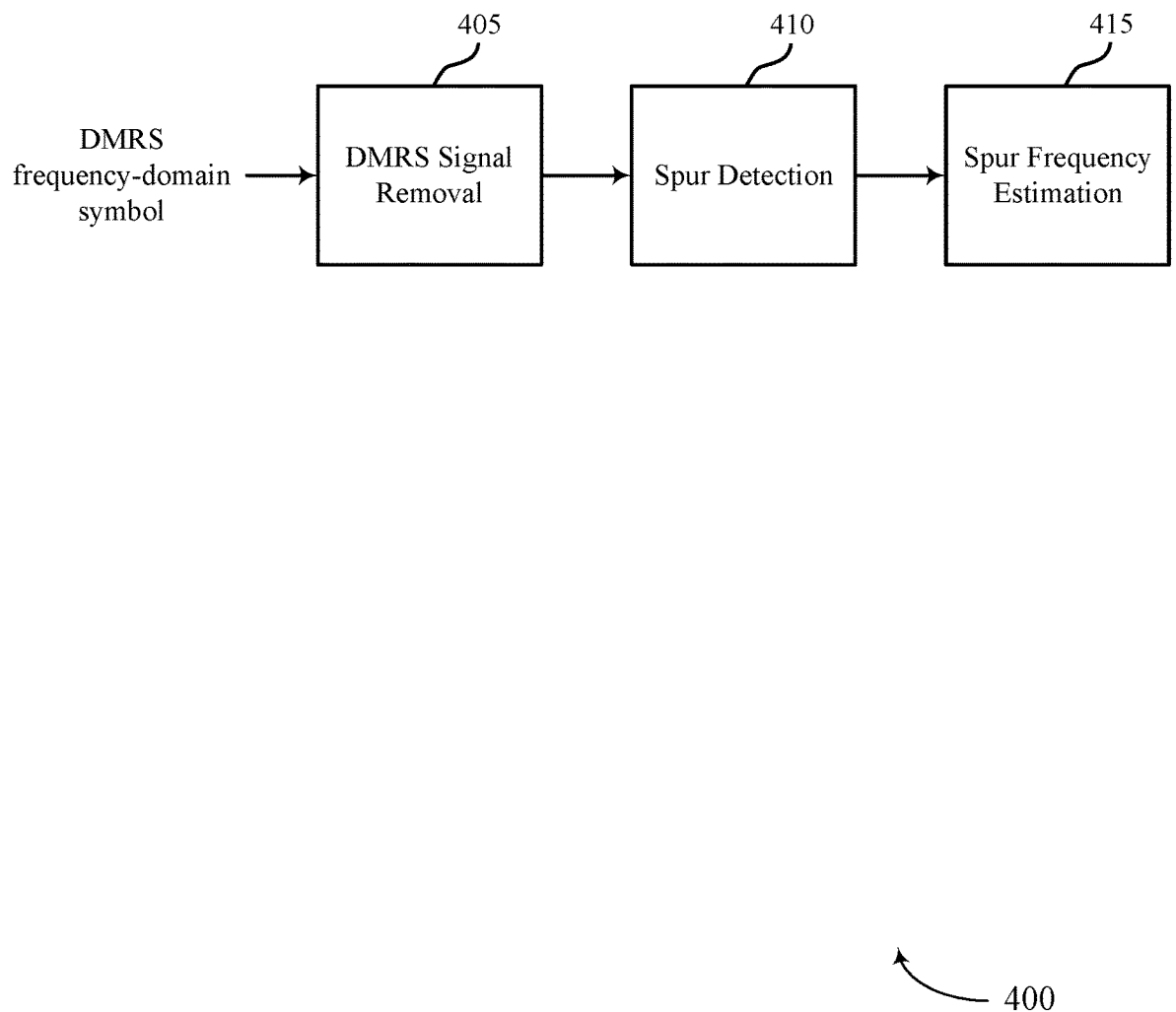
FIG. 4 shows an example of a frequency spur detection and estimation procedure that supports spur detection, estimation, and mitigation in accordance with one or more aspects of the present disclosure.

FIG. 4 shows an example of a frequency spur detection and estimation procedure 400 that supports spur detection, estimation, and mitigation in accordance with one or more aspects of the present disclosure. In some examples, the frequency spur detection and estimation procedure 400 may implement aspects of the wireless communications systems 100 and 300 and the network architecture 200 or may be implemented by aspects of the wireless communications systems 100 and 300 and the network architecture 200. For example, as described with reference to FIG. 3, a UE 115 may support DMRS-based online spur detection and estimation to mitigate the effects of frequency spurs on DMRSs and other signals.

As described herein with reference to FIG. 3, the UE 115 may receive a DMRS via a channel from a network entity 105. The UE 115 may use the DMRS to detect dynamic frequency spurs and estimate their frequencies in order to mitigate their effects. The UE 115 may convert the DMRS into one or more frequency-domain symbols (e.g., based on applying an FFT). At 405, the UE 115 may remove a DMRS signal component from the frequency-domain symbols of the DMRS based on a channel estimation of the channel to obtain a frequency-domain noise signal. For example, the UE 115 may use a filtering procedure on one or more frequency-domain symbols of the DMRS to obtain the frequency-domain noise signal, which may include noise (e.g., channel estimation-based noise) and one or more frequency spurs. In some examples, the UE 115 may perform the filtering (e.g., to obtain the frequency-domain noise signal or remove of the DMRS signal component) over a duration of time to further reduce impact of noise on the frequency-domain symbols.

At 410, the UE 115 may perform a threshold-based spur detection procedure to detect frequency spurs present in the frequency-domain noise signal. As described herein with reference to FIG. 5, the UE 115 may detect the one or more frequency spurs based on a frequency threshold.

If the UE 115 detects a frequency spur, then the UE 115 may perform frequency estimation at 415 to estimate a frequency associated with the frequency spur. The UE 115 may support search-based frequency estimation and low-complexity, approximation-based frequency estimation. For example, the search-based frequency estimation may include identifying the frequency based on a set of frequency-domain kernels or a set of time-domain kernels with particular spacing, and the approximation-based frequency estimation may include identifying the frequency based on a sampling function. In some examples, the UE 115 may apply LLR scaling, LLR saturation, RNN cleaning or nulling (e.g., a noise mitigation procedure), or any combination thereof to further process the DMRS and mitigate the effects of the frequency spurs.

Figure 5:
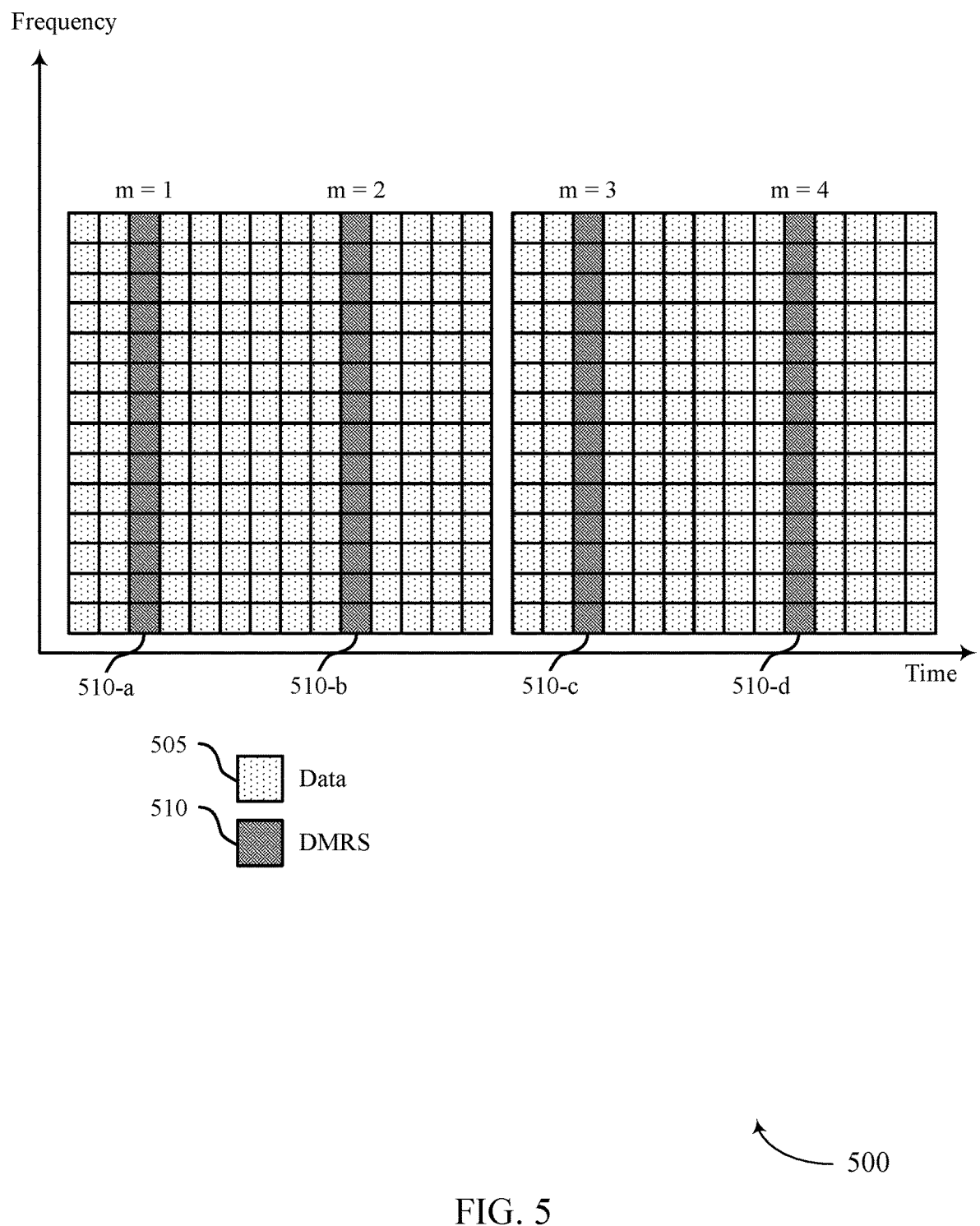
FIG. 5 shows an example of demodulation reference signal (DMRS) symbols that support spur detection, estimation, and mitigation in accordance with one or more aspects of the present disclosure.

FIG. 5 shows an example of a DMRS symbols 500 that support spur detection, estimation, and mitigation in accordance with one or more aspects of the present disclosure. In some examples, the DMRS symbols 500 may implement aspects of the wireless communications systems 100 and 300, the network architecture 200, and the frequency spur detection and estimation procedure 400, or may be implemented by aspects of the wireless communications systems 100 and 300, the network architecture 200, and the frequency spur detection and estimation procedure 400. For example, a UE 115 may utilize the DMRS symbols 500 for DMRS-based online spur detection and estimation to mitigate the effects of frequency spurs on DMRSs and other signals.

A UE 115 may communicate data 505 and DMRSs 510 with a network entity 105. For example, the UE 115 may periodically receive DMRSs 510 in the time domain. The UE 115 may convert the DMRSs 510 to the frequency-domain such that it may filter and otherwise process frequency-domain symbols of the DMRS 510 to detect and mitigate frequency spurs.

As described herein with reference to FIGS. 3, and 4, UE 115 may perform a threshold-based spur detection procedure to detect frequency spurs present in a frequency-domain noise signal associated with one or more frequency-domain symbols of a DMRS 510 (e.g., within a bandwidth). For example, an mth DMRS symbol of the received DMRS 510 for a kth tone (e.g., frequency) may be represented as Ym [k]=H [k] XDMRS [k]+W [k]+spur [k], where H [k] may represent the channel, XDMRS [k] may represent a DMRS sequence being transmitted, k may represent an index of a tone (e.g., frequency), W [k] may represent the signal noise, and spur [k] may represent a frequency spur at that frequency k. If H [k] represents the estimated channel, then the post-processed signal Ŷm [k](e.g., the frequency-domain noise signal which has been filtered or removed from the DMRS signal), then Ŷm [k]=Ym [k]-A [k] XDMRS [k]=spur [k]+W [k]+e [k], where e [k] may represent a channel estimation error.

The UE 115 may use the signal Ŷm [k] to perform the spur detection procedure. To perform the spur detection, the UE 115 may combine multiple frequency-domain noise signals associated with the frequency-domain symbols in a time-domain for multiple DMRSs received via the channel. For example, the UE 115 may combine the frequency-domain noise signals as $$\hat{Y}[k] = \sum_{m=1}^{d_{avg}} |\hat{Y}_m[k]|^2.$$

In this way, the UE 115 may effectively average the frequency-domain noise signals and use the averaged signals to detect the frequency spurs more accurately. For example, the UE 115 may average the frequency-domain noise signals over a DMRS 510-*a* (e.g., m=1), a DMRS 510-*b* (e.g., m=2), a DMRS 510-*c* (e.g., m=3), and a DMRS 510-*d* (e.g., m=4), or any combination thereof.

The UE 115 may use a frequency threshold to detect the frequency spurs. For example, if $\hat{Y}[k]>TH_{DET}$ (where $TH_{DET}$ may represent the frequency threshold), then the UE 115 may detect a spur. That is, the UE 115 may detect the frequency spurs based on the combined frequency-domain noise signals satisfy a frequency threshold. In some examples, the frequency threshold may indicate a detection performance in terms of missed detection, a false alarm rate, or both.

If the UE 115 detects a frequency spur, then the UE 115 may perform frequency estimation to estimate the frequency associated with the frequency spur. The UE 115 may support search-based frequency estimation and low-complexity approximation-based frequency estimation. Using the search-based frequency estimation, the UE 115 may define a set of frequency-domain kernels $T_i(k)=FFT(e^{j2\pi f i n/F s})=$sinc $(k-f_i)$, where $f_i$ may represent a frequency associated with an ith kernel. Alternatively, the UE 115 may similarly define a set of time-domain kernels, where each ith kernel may be associated with a given time. Using the set of frequency-domain kernels as an example, the range of values of $f_i$ may span twice the subcarrier spacing centered around a frequency (associated with a detected frequency spur). There may be N frequency-domain kernels with a uniform and a non-uniform frequency spacing to cover a given search range of frequencies (e.g., twice the subcarrier spacing centered around a frequency associated with a detected frequency spur). The UE 115 may select a value of N based on spur frequency detection accuracy and search complexity. In some examples, an estimated spur frequency corresponding to a kernel $\hat{i}$ may be $$\hat{i} = \underset{i}{\operatorname{argmax}} \sum\nolimits_{k=1}^{N_{fft}} \hat{R}(k) T_i^*(k).$$

The UE 115 may use one or more frequency-domain kernels of the set of frequency-domain kernels to estimate the frequency associated with the one or more detected frequency spurs.

Alternatively, the UE 115 may estimate the frequency associated with the detected frequency spurs based on a sampling function (e.g., a sinc approximation). That is, the UE 115 may use a sampling function to estimate the frequency based on an index associated with the frequency spur being within one index of a maximum frequency. For example, the frequency-domain noise signal $\hat{Y}(k_i)$ may be represented as $\hat{Y}(kt)=W(k_i)+a_i^2\mathrm{sinc}^2(\theta_i)$, where $k_i$ may represent a frequency-domain tone (e.g., frequency) index corresponding to an ith frequency spur and $\theta_i=f_i-k_j$. In such cases, the indices $k_i+1$ or $k_i-1$ may be maximum frequencies (e.g., peaks) corresponding to the spur frequency. That is, max ($\hat{Y}(k_i+1)$, $\hat{Y}(k_i-1)$)=$W(k_i)+a_i^2\mathrm{sinc}^2(\theta_i-1)$, where $a_i^2\mathrm{sinc}^2(\theta_i-1)$ may be the sinc function. Using $\hat{Y}[k]$ at the tones $k_i$ and $k_i\pm1$, the UE 115 may estimate the frequency using $$\frac{\hat{Y}[k_i]}{\max(\hat{Y}[k_i-1])} \approx \frac{\mathrm{sinc}^2(\theta_i)}{\mathrm{sinc}^2(\theta_i-1)} = \frac{(1-\theta_i)^2}{\theta_i^2}, \text{ where}$$

-continued $$\theta_i = \frac{1}{1+\sqrt{\frac{\hat{Y}[k_i]}{\max(\hat{Y}[k_i-1],\hat{Y}[k_i+1])}}}.$$

Figure 6:
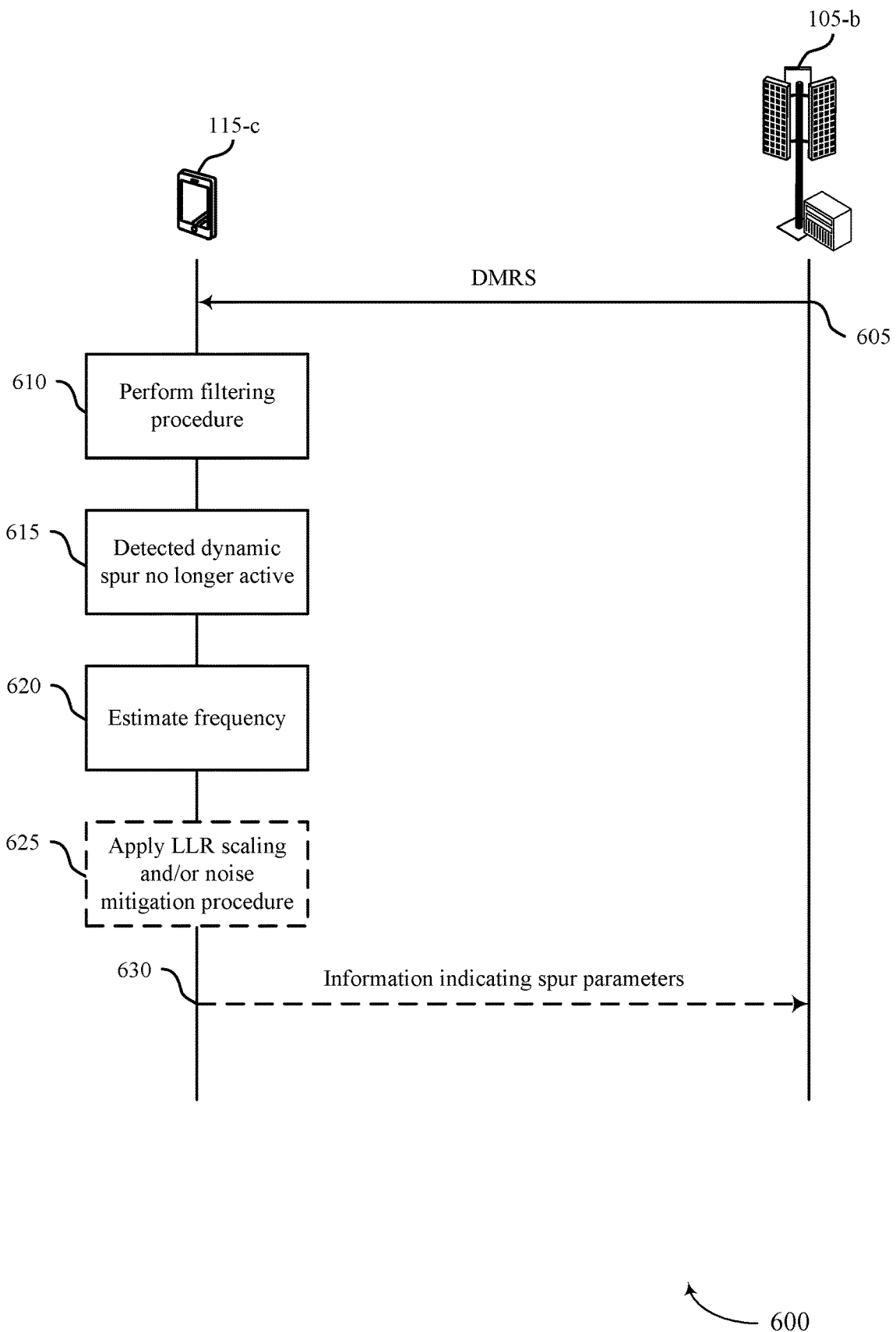
FIGS. 6 and 7 show examples of process flows that support spur detection, estimation, and mitigation in accordance with one or more aspects of the present disclosure.

FIG. 6 shows an example of a process flow 600 that supports spur detection, estimation, and mitigation in accordance with one or more aspects of the present disclosure. The process flow 600 may implement aspects of wireless communications systems 100 and 300 and the network architecture 200, or may be implemented by aspects of the wireless communications system 100 and 300 and the network architecture 200. For example, the process flow 600 may illustrate operations between a UE 115-*c* and a network entity 105-*b*, which may be examples of corresponding devices described herein. In the following description of the process flow 600, the operations between the UE 115-*c* and the network entity 105-*b* may be transmitted in a different order than the example order shown, or the operations performed by the UE 115-*c* and the network entity 105-*b* may be performed in different orders or at different times. Some operations may also be omitted from the process flow 600, and other operations may be added to the process flow 600.

At 605, the UE 115-*c* may receive (and the network entity 105-*b* may output) a DMRS via a channel associated with the UE 115-*c*. In some examples, the UE 115-*c* may receive multiple DMRSs (e.g., periodically).

At 610, the UE 115-*c* may generate a frequency-domain noise signal associated with the one or more frequency-domain symbols of the DMRS by performing, based on a channel estimation of the channel associated with the UE 115-*c*, a filtering procedure on one or more frequency-domain symbols of the DMRS. That is, after converting the DMRS to the frequency domain, the UE 115-*c* may filter out the frequency-domain noise signal from the DMRS component of the signal. The frequency-domain noise signal may include channel estimation noise and one or more frequency spurs.

At 615, the UE 115-*c* may detect one or more frequency spurs associated with the one or more frequency-domain symbols by performing a spur detection procedure on the frequency-domain noise signal. For example, the UE 115-*c* may detect the one or more frequency spurs based on comparing a frequency of the frequency-domain noise signal with a frequency threshold.

At 620, the UE 115-*c* may estimate a frequency associated with the one or more frequency spurs based on the spur detection procedure. To estimate the frequency, the UE 115-*c* may use a search-based method that includes estimating the frequency based on one or more frequency-domain kernels or an approximation-based method that includes estimating the frequency based on a sampling function.

At 625, the UE 115-*c* may apply LLR scaling to the frequency associated with the one or more frequency spurs based on the spur detection. In some examples, the UE 115-*c* may apply LLR saturation to the LLR scaling to further mitigate the impacts of the frequency spurs. Additionally, or alternatively, the UE 115-*c* may apply a noise mitigation procedure (e.g., RNN cleaning or nulling) to the DMRS based on the spur detection procedure, where the one or more frequency-domain symbols may be excluded from the noise mitigation procedure.

At 630, the UE 115-*c* may transmit (and the network entity 105-*b* may obtain) information indicating one or more spur parameters that correspond to the one or more frequency spurs, where the one or more spur parameters may include the estimated frequency. The network entity 105-*b* may use the spur parameters to configure a rate matching pattern for subsequent communications with the UE 115-*c*

Figure 7:
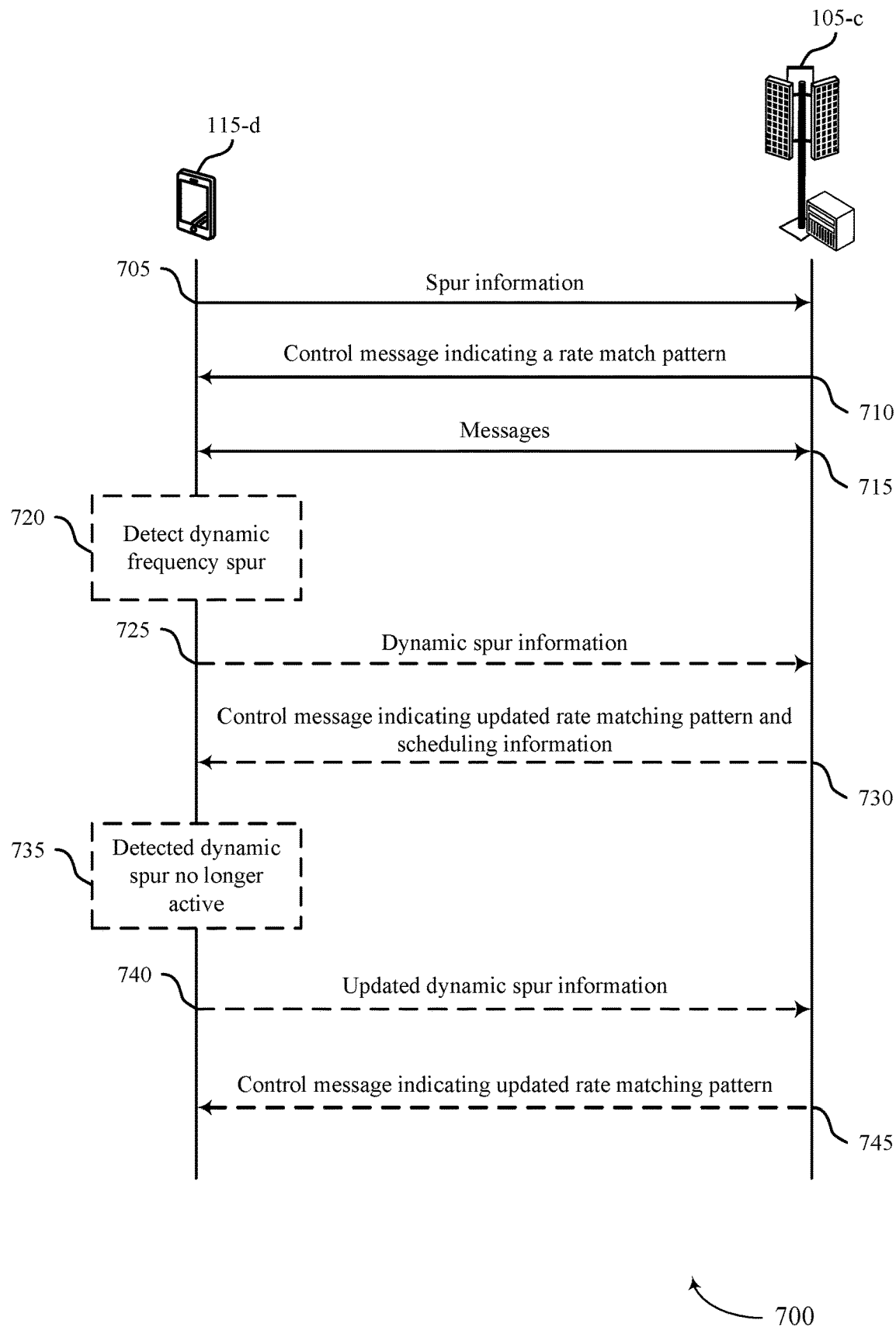

FIG. 7 shows an example of a process flow 700 that supports spur detection, estimation, and mitigation in accordance with one or more aspects of the present disclosure. The process flow 700 may implement aspects of wireless communications systems 100 and 300 and the network architecture 200, or may be implemented by aspects of the wireless communications system 100 and 300 and the network architecture 200. For example, the process flow 700 may illustrate operations between a UE 115-*d* and a network entity 105-*c*, which may be examples of corresponding devices described herein. In the following description of the process flow 700, the operations between the UE 115-*d* and the network entity 105-*c* may be transmitted in a different order than the example order shown, or the operations performed by the UE 115-*d* and the network entity 105-*c* may be performed in different orders or at different times. Some operations may also be omitted from the process flow 700, and other operations may be added to the process flow 700.

At 705, the UE 115-*d* may transmit, and the network entity 105-*c* may obtain, information indicating one or more spur parameters that correspond to one or more frequency spurs associated with the UE 115-*d*. For example, the spur parameters may include a frequency, location, and type (e.g., static, dynamic) associated with the one or more frequency spurs. The UE 115-*d* may transmit the information after performing a spur detection procedure to detect the one or more frequency spurs and estimating the frequency associated with the one or more frequency spurs.

At 710, the UE 115-*d* may receive, and the network entity 105-*c* may output, after transmission of the information, a control message indicating a rate matching pattern for one or more subsequent communications for the UE 115-*d*. The rate matching pattern may be based on the one or more spur parameters that correspond to the one or more frequency spurs associated with the UE 115-*d*. That is, the network entity 105-*c* may configure the rate matching pattern such that the subsequent communications may avoid the frequency spurs.

At 715, the UE 115-*d* and the network entity 105-*c* may communicate one or more messages in accordance with the rate matching pattern for the UE 115-*d*. As such, the one or more messages may be less affected or unaffected by the one or more frequency spurs because of the rate matching pattern.

At 720, the UE 115-*d* may detect one or more additional frequency spurs associated with the UE 115-*d*. In some examples, the one or more additional frequency spurs may be dynamic frequency spurs, where the one or more original frequency spurs may be static frequency spurs.

At 725, the UE 115-*d* may transmit, and the network entity 105-*c* may obtain, second information indicating one or more second spur parameters that correspond to the one or more additional frequency spurs. The one or more second spur parameters may include a frequency, location, and type (e.g., dynamic) associated with the one or more frequency spurs. The UE 115-*d* may transmit the information after performing a spur detection procedure to detect the one or more additional frequency spurs and estimating the frequency associated with the one or more additional frequency spurs.

At 730, the UE 115-*d* may receive, and the network entity 105-*c* may output, after transmission of the second information, a second control message indicating an updated rate matching pattern for the one or more subsequent communications for the UE 115-*d*. The updated rate matching pattern may be based on the one or more second spur parameters. That is, the network entity 105-*c* may configure the rate matching pattern such that the subsequent communications may avoid the one or more additional frequency spurs. Additionally, or alternatively, the network entity 105-*c* may schedule one or more downlink messages (e.g., PDSCH) specifically to avoid the one or more additional frequency spurs.

At 735, the UE 115-*d* may detect that the one or more additional frequency spurs associated with the UE 115-*d* are no longer active. That is, the UE 115-*d* may identify that additional DMRSs may exclude the one or more additional frequency spurs.

At 740, the UE 115-*d* may transmit, and the network entity 105-*c* may obtain, updated second information indicating one or more updated second spur parameters that correspond to the one or more additional frequency spurs which are no longer active. That is, the UE 115-*d* may periodically update the second information based on changes to the one or more additional frequency spurs.

Figure 8:
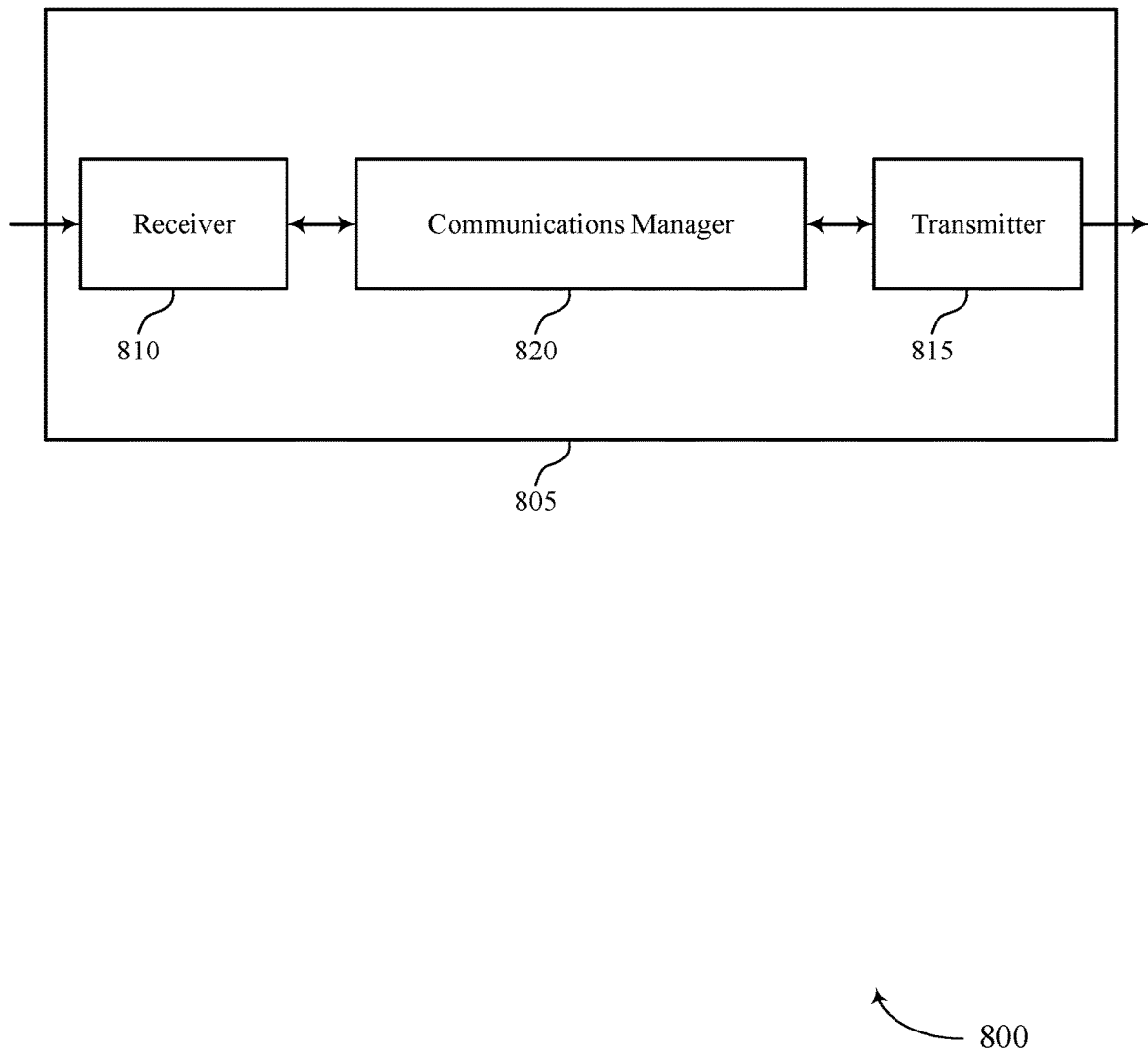
FIGS. 8 and 9 show block diagrams of devices that support spur detection, estimation, and mitigation in accordance with one or more aspects of the present disclosure.

At 745, the UE 115-*d* may receive, and the network entity 105-*c* may output, after transmission of the updated second information, a third control message indicating an updated rate matching pattern for the one or more subsequent communications for the UE 115-*d*. The updated rate matching pattern may be based on the one or more updated second spur parameters FIG. 8 shows a block diagram 800 of a device 805 that supports spur detection, estimation, and mitigation in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to spur detection, estimation, and mitigation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to spur detection, estimation, and mitigation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations or components thereof may be examples of means for performing various aspects of spur detection, estimation, and mitigation as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving a DMRS via a channel associated with the UE. The communications manager 820 is capable of, configured to, or operable to support a means for generating a frequency-domain noise signal associated with one or more frequency-domain symbols of the DMRS by performing, based on a channel estimation of the channel associated with the UE, a filtering procedure on the one or more frequency-domain symbols of the DMRS. The communications manager 820 is capable of, configured to, or operable to support a means for detecting one or more frequency spurs associated with the one or more frequency-domain symbols by performing a spur detection procedure on the frequency-domain noise signal. The communications manager 820 is capable of, configured to, or operable to support a means for estimating a frequency associated with the one or more frequency spurs based on the spur detection procedure.

Additionally, or alternatively, the communications manager 820 may support wireless communications in accordance with examples as disclosed herein. For example, the communications manager 820 is capable of, configured to, or operable to support a means for transmitting information indicating one or more spur parameters that correspond to one or more frequency spurs associated with the UE. The communications manager 820 is capable of, configured to, or operable to support a means for receiving, after transmission of the information, a control message indicating a rate matching pattern for one or more subsequent communications for the UE, where the rate matching pattern is based on the one or more spur parameters that correspond to the one or more frequency spurs associated with the UE. The communications manager 820 is capable of, configured to, or operable to support a means for communicating one or more messages in accordance with the rate matching pattern for the UE.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for spur detection, estimation, and mitigation, which may improve throughput, reduce latency, improve the quality of communications, improve demodulation and decoding success, and reduce the impacts of frequency spurs on communications.

Figure 9:
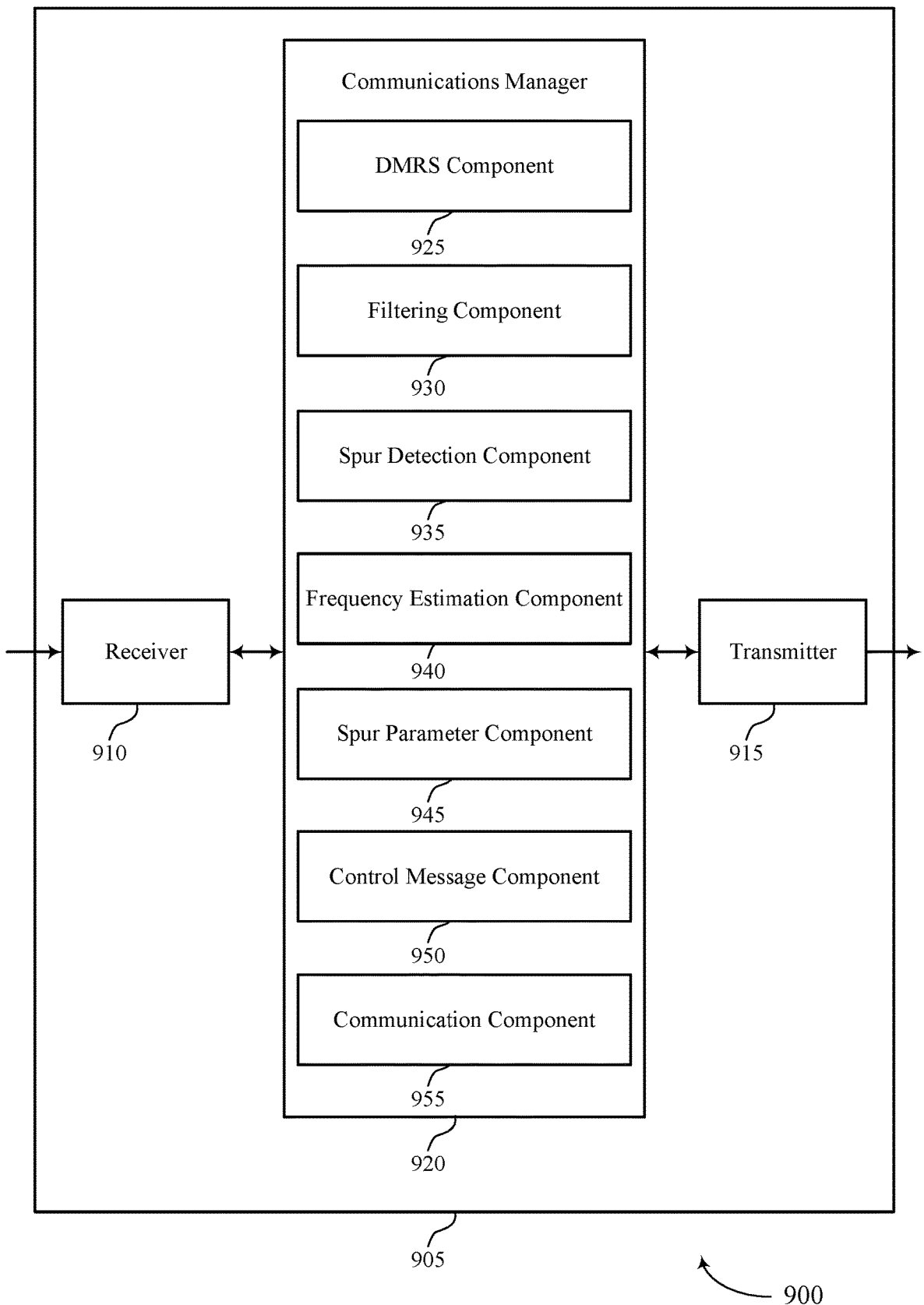

FIG. 9 shows a block diagram 900 of a device 905 that supports spur detection, estimation, and mitigation in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to spur detection, estimation, and mitigation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to spur detection, estimation, and mitigation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of spur detection, estimation, and mitigation as described herein. For example, the communications manager 920 may include a DMRS component 925, a filtering component 930, a spur detection component 935, a frequency estimation component 940, a spur parameter component 945, a control message component 950, a communication component 955, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The DMRS component 925 is capable of, configured to, or operable to support a means for receiving a DMRS via a channel associated with the UE. The filtering component 930 is capable of, configured to, or operable to support a means for generating a frequency-domain noise signal associated with one or more frequency-domain symbols of the DMRS by performing, based on a channel estimation of the channel associated with the UE, a filtering procedure on the one or more frequency-domain symbols of the DMRS. The spur detection component 935 is capable of, configured to, or operable to support a means for detecting one or more frequency spurs associated with the one or more frequency-domain symbols by performing a spur detection procedure on the frequency-domain noise signal. The frequency estimation component 940 is capable of, configured to, or operable to support a means for estimating a frequency associated with the one or more frequency spurs based on the spur detection procedure.

Additionally, or alternatively, the communications manager 920 may support wireless communications in accordance with examples as disclosed herein. The spur parameter component 945 is capable of, configured to, or operable to support a means for transmitting information indicating one or more spur parameters that correspond to one or more frequency spurs associated with the UE. The control message component 950 is capable of, configured to, or operable to support a means for receiving, after transmission of the information, a control message indicating a rate matching pattern for one or more subsequent communications for the UE, where the rate matching pattern is based on the one or more spur parameters that correspond to the one or more frequency spurs associated with the UE. The communication component 955 is capable of, configured to, or operable to support a means for communicating one or more messages in accordance with the rate matching pattern for the UE.

Figure 10:
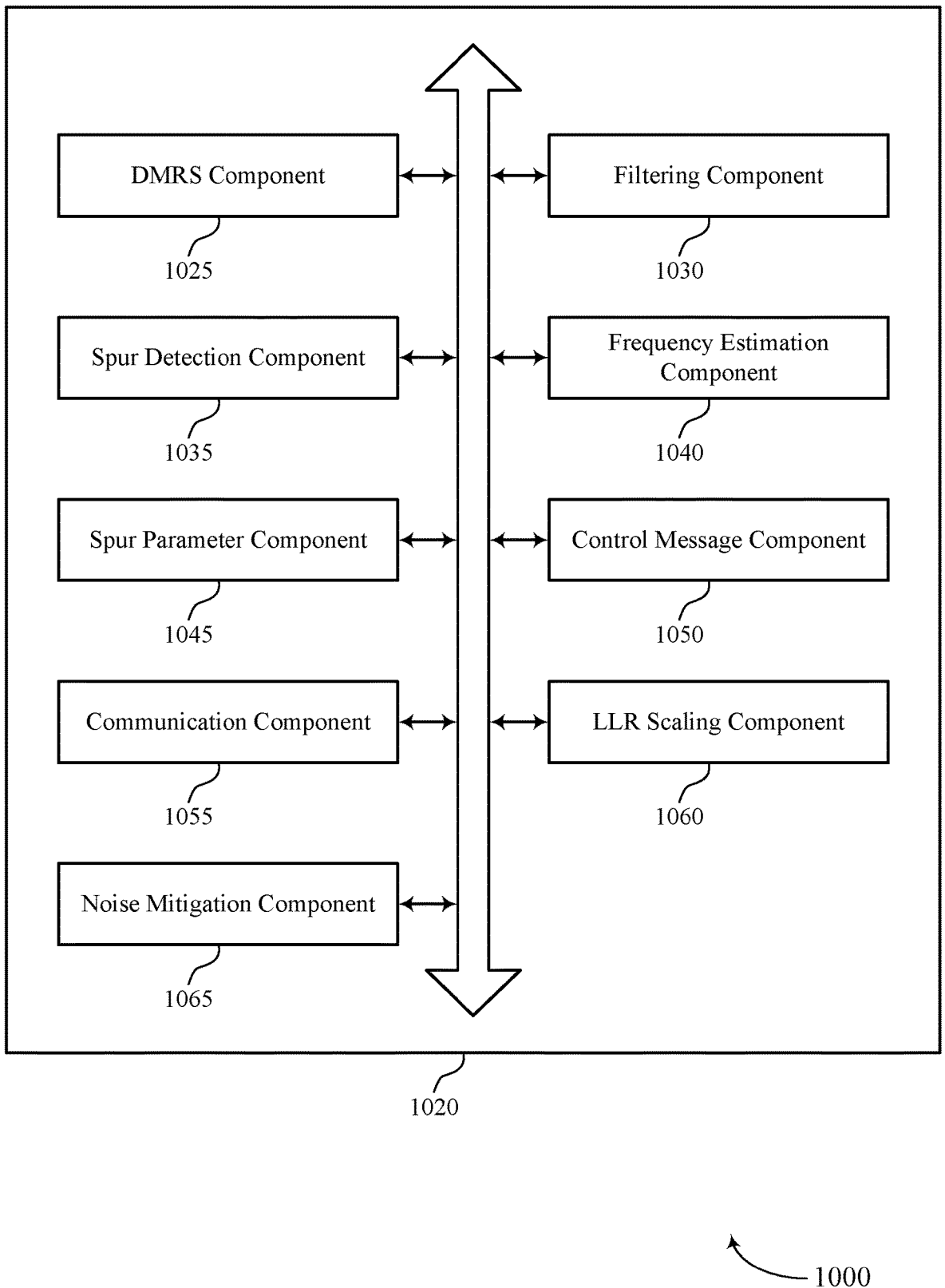
FIG. 10 shows a block diagram of a communications manager that supports spur detection, estimation, and mitigation in accordance with one or more aspects of the present disclosure.

FIG. 10 shows a block diagram 1000 of a communications manager 1020 that supports spur detection, estimation, and mitigation in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of spur detection, estimation, and mitigation as described herein. For example, the communications manager 1020 may include a DMRS component 1025, a filtering component 1030, a spur detection component 1035, a frequency estimation component 1040, a spur parameter component 1045, a control message component 1050, a communication component 1055, an LLR scaling component 1060, a noise mitigation component 1065, or any combination thereof. Each of these components, or components or subcomponents thereof (e.g., one or more processors, one or more memories), may communicate, directly or indirectly, with one another (e.g., via one or more buses).

The communications manager 1020 may support wireless communications in accordance with examples as disclosed herein. The DMRS component 1025 is capable of, configured to, or operable to support a means for receiving a DMRS via a channel associated with the UE. The filtering component 1030 is capable of, configured to, or operable to support a means for generating a frequency-domain noise signal associated with one or more frequency-domain symbols of the DMRS by performing, based on a channel estimation of the channel associated with the UE, a filtering procedure on the one or more frequency-domain symbols of the DMRS. The spur detection component 1035 is capable of, configured to, or operable to support a means for detecting one or more frequency spurs associated with the one or more frequency-domain symbols by performing a spur detection procedure on the frequency-domain noise signal. The frequency estimation component 1040 is capable of, configured to, or operable to support a means for estimating a frequency associated with the one or more frequency spurs based on the spur detection procedure.

In some examples, to support detecting the one or more frequency spurs, the spur detection component 1035 is capable of, configured to, or operable to support a means for combining, for a set of multiple demodulation references signals received via the channel, a set of multiple frequency-domain noise signals associated with the one or more frequency-domain symbols in a time-domain. In some examples, to support performing the spur detection procedure, the spur detection component 1035 is capable of, configured to, or operable to support a means for detecting the one or more frequency spurs associated with the one or more frequency-domain symbols based on the combined frequency-domain noise signal.

In some examples, to support detecting the one or more frequency spurs, the spur detection component 1035 is capable of, configured to, or operable to support a means for detecting the one or more frequency spurs associated with the one or more frequency-domain symbols based on a combined frequency-domain noise signals satisfying a frequency threshold.

In some examples, to support estimating the frequency associated with the one or more frequency spurs, the frequency estimation component 1040 is capable of, configured to, or operable to support a means for determining a set of frequency-domain kernels or a set of time-domain kernels, where a range of frequencies associated with the set of frequency-domain kernels or a range of times associated with the set of time-domain kernels is based on a subcarrier spacing centered around a frequency spur of the one or more frequency spurs, and where the set of frequency-domain kernels are associated with a uniform spacing or a non-uniform spacing over the range of frequencies or the set of time-domain kernels are associated with a uniform spacing or a non-uniform spacing over the range of times. In some examples, to support estimating the frequency associated with the one or more frequency spurs, the frequency estimation component 1040 is capable of, configured to, or operable to support a means for estimating the frequency associated with the one or more frequency spurs based on one or more frequency-domain kernels of the set of frequency-domain kernels or one or more time-domain kernels of the set of time-domain kernels associated with the one or more frequency spurs.

In some examples, to support estimating the frequency associated with the one or more frequency spurs, the frequency estimation component 1040 is capable of, configured to, or operable to support a means for estimating, in accordance with a sampling function, a frequency associated with a frequency spur of the one or more frequency spurs based on an index associated with the frequency spur being within one index of a maximum frequency.

In some examples, to support estimating the frequency associated with the one or more frequency spurs, the spur parameter component 1045 is capable of, configured to, or operable to support a means for transmitting information indicating one or more spur parameters that correspond to the one or more frequency spurs, where the one or more spur parameters includes the frequency.

In some examples, the LLR scaling component 1060 is capable of, configured to, or operable to support a means for applying log-likelihood scaling to the frequency associated with the one or more frequency spurs based on the spur detection procedure. In some examples, LLRs associated with the frequency are limited to a range for the log-likelihood scaling based on one or more saturation values.

In some examples, the noise mitigation component 1065 is capable of, configured to, or operable to support a means for applying a noise mitigation procedure to the DMRS based on the spur detection procedure, where the one or more frequency-domain symbols are excluded from the noise mitigation procedure.

Additionally, or alternatively, the communications manager 1020 may support wireless communications in accordance with examples as disclosed herein. The spur parameter component 1045 is capable of, configured to, or operable to support a means for transmitting information indicating one or more spur parameters that correspond to one or more frequency spurs associated with the UE. The control message component 1050 is capable of, configured to, or operable to support a means for receiving, after transmission of the information, a control message indicating a rate matching pattern for one or more subsequent communications for the UE, where the rate matching pattern is based on the one or more spur parameters that correspond to the one or more frequency spurs associated with the UE. The communication component 1055 is capable of, configured to, or operable to support a means for communicating one or more messages in accordance with the rate matching pattern for the UE.

In some examples, the spur detection component 1035 is capable of, configured to, or operable to support a means for detecting one or more additional frequency spurs associated with the UE. In some examples, the spur parameter component 1045 is capable of, configured to, or operable to support a means for transmitting second information indicating one or more second spur parameters that correspond to the one or more additional frequency spurs. In some examples, the control message component 1050 is capable of, configured to, or operable to support a means for receiving, after transmission of the second information, a second control message indicating an updated rate matching pattern for the one or more subsequent communications for the UE, where the updated rate matching pattern is based on the one or more second spur parameters.

In some examples, the second control message schedules one or more downlink messages in accordance with the updated rate matching pattern based on the one or more second spur parameters.

In some examples, the updated rate matching pattern is based on one or more MCS values associated with the one or more subsequent communications.

In some examples, to support transmitting the information, the spur parameter component 1045 is capable of, configured to, or operable to support a means for transmitting a report including CSF and the information indicating the one or more spur parameters.

In some examples, to support transmitting the information, the spur parameter component 1045 is capable of, configured to, or operable to support a means for transmitting a bitmap corresponding to the information indicating the one or more spur parameters, where the bitmap indicates one or more component carriers associated with the one or more frequency spurs.

In some examples, the information indicates a BWP index, a serving cell index, a frequency index, or any combination thereof associated with the one or more frequency spurs.

In some examples, the spur parameter component 1045 is capable of, configured to, or operable to support a means for transmitting the information indicating the one or more spur parameters that correspond to the one or more frequency spurs, where the one or more frequency spurs are associated with one or more concurrent transmissions via a first FR and a second FR. In some examples, the control message component 1050 is capable of, configured to, or operable to support a means for receiving, after transmission of the information, DCI indicating the rate matching pattern, a puncturing pattern, or both for the one or more concurrent transmissions, where the rate matching pattern, the puncturing pattern, or both are based on the one or more spur parameters.

In some examples, the information includes a frequency associated with the one or more frequency spurs, a location associated with the one or more frequency spurs, a type of the one or more frequency spurs, or any combination thereof. In some examples, the type may indicate a static spur, a dynamic spur, or a lack of spurs.

In some examples, to support transmitting the information, the spur parameter component 1045 is capable of, configured to, or operable to support a means for transmitting a MAC-CE indicating the one or more spur parameters.

In some examples, the spur parameter component 1045 is capable of, configured to, or operable to support a means for receiving a MAC-CE that requests the information indicating the one or more spur parameters from the UE.

In some examples, the spur detection component 1035 is capable of, configured to, or operable to support a means for detecting the one or more frequency spurs associated with the UE by performing a spur detection procedure on a frequency-domain noise signal. In some examples, the frequency estimation component 1040 is capable of, configured to, or operable to support a means for estimating a frequency associated with the one or more frequency spurs based on the spur detection procedure. In some examples, the spur parameter component 1045 is capable of, configured to, or operable to support a means for transmitting the information indicating the one or more spur parameters based on the spur detection procedure and the frequency.

Figure 11:
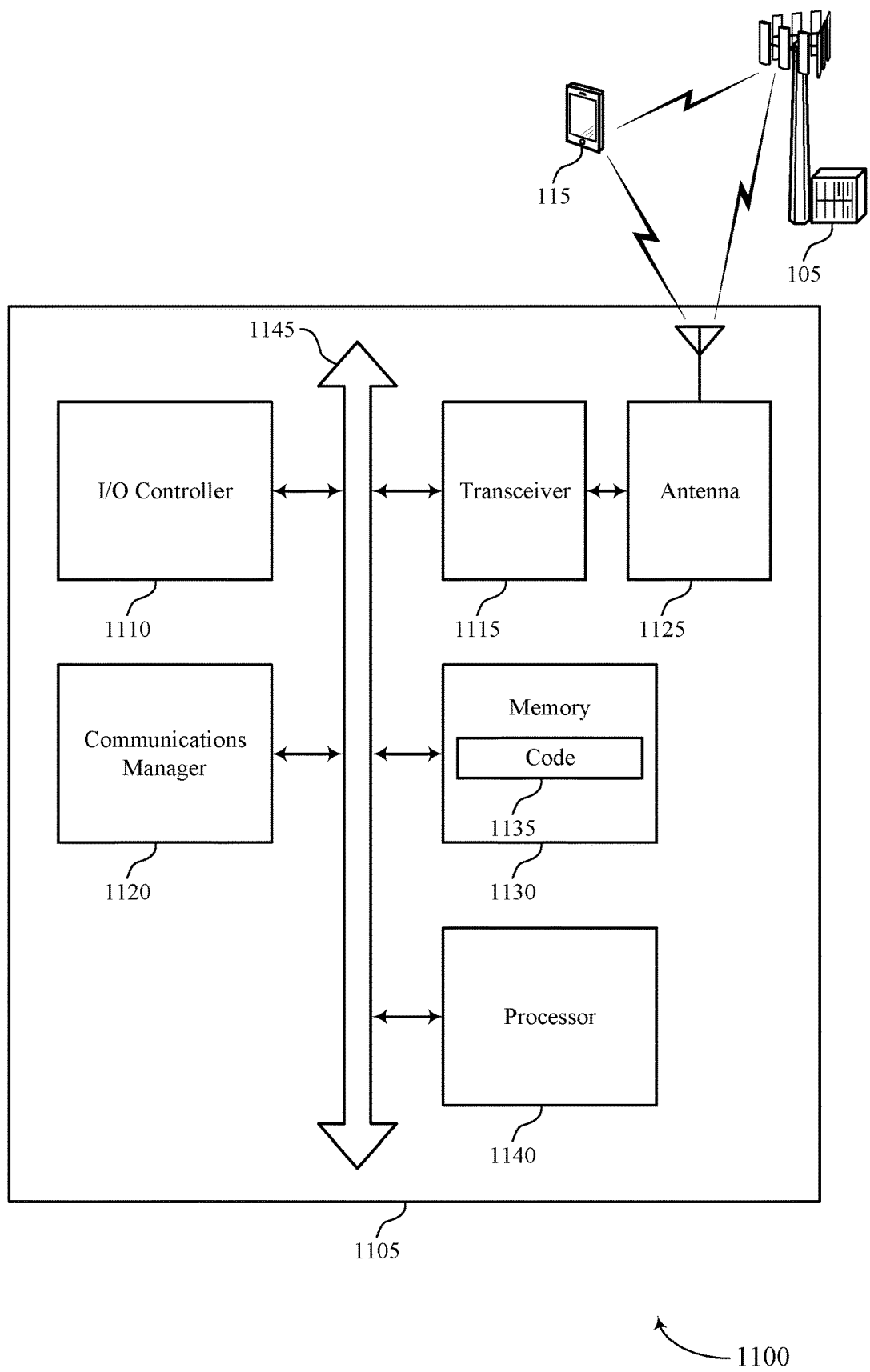
FIG. 11 shows a diagram of a system including a device that supports spur detection, estimation, and mitigation in accordance with one or more aspects of the present disclosure.

FIG. 11 shows a diagram of a system 1100 including a device 1105 that supports spur detection, estimation, and mitigation in accordance with one or more aspects of the present disclosure. The device 1105 may be an example of or include components of a device 805, a device 905, or a UE 115 as described herein. The device 1105 may communicate (e.g., wirelessly) with one or more other devices (e.g., network entities 105, UEs 115, or a combination thereof). The device 1105 may include components for bi-directional voice and data communications including components for transmitting and receiving communications, such as a communications manager 1120, an input/output (I/O) controller, such as an I/O controller 1110, a transceiver 1115, one or more antennas 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna. However, in some other cases, the device 1105 may have more than one antenna, which may be capable of concurrently transmitting or receiving multiple wireless transmissions. The transceiver 1115 may communicate bi-directionally via the one or more antennas 1125 using wired or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable, or processor-executable code, such as the code 1135. The code 1135 may include instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may include, among other things, a basic I/O system (BIOS) which may control basic hardware or software operation such as the interaction with peripheral components or devices.

The at least one processor 1140 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting spur detection, estimation, and mitigation). For example, the device 1105 or a component of the device 1105 may include at least one processor 1140 and at least one memory 1130 coupled with or to the at least one processor 1140, the at least one processor 1140 and the at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions described herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. For example, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code 1135 (e.g., processor-executable code) stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for receiving a DMRS via a channel associated with the UE. The communications manager 1120 is capable of, configured to, or operable to support a means for generating a frequency-domain noise signal associated with one or more frequency-domain symbols of the DMRS by performing, based on a channel estimation of the channel associated with the UE, a filtering procedure on the one or more frequency-domain symbols of the DMRS. The communications manager 1120 is capable of, configured to, or operable to support a means for detecting one or more frequency spurs associated with the one or more frequency-domain symbols by performing a spur detection procedure on the frequency-domain noise signal. The communications manager 1120 is capable of, configured to, or operable to support a means for estimating a frequency associated with the one or more frequency spurs based on the spur detection procedure.

Additionally, or alternatively, the communications manager 1120 may support wireless communications in accordance with examples as disclosed herein. For example, the communications manager 1120 is capable of, configured to, or operable to support a means for transmitting information indicating one or more spur parameters that correspond to one or more frequency spurs associated with the UE. The communications manager 1120 is capable of, configured to, or operable to support a means for receiving, after transmission of the information, a control message indicating a rate matching pattern for one or more subsequent communications for the UE, where the rate matching pattern is based on the one or more spur parameters that correspond to the one or more frequency spurs associated with the UE. The communications manager 1120 is capable of, configured to, or operable to support a means for communicating one or more messages in accordance with the rate matching pattern for the UE.

By including or configuring the communications manager 1120 in accordance with examples as described herein, the device 1105 may support techniques for spur detection, estimation, and mitigation, which may improve throughput, reduce latency, improve the quality of communications, improve demodulation and decoding success, and reduce the impacts of frequency spurs on communications.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of spur detection, estimation, and mitigation as described herein, or the at least one processor 1140 and the at least one memory 1130 may be otherwise configured to, individually or collectively, perform or support such operations.

Figure 12:
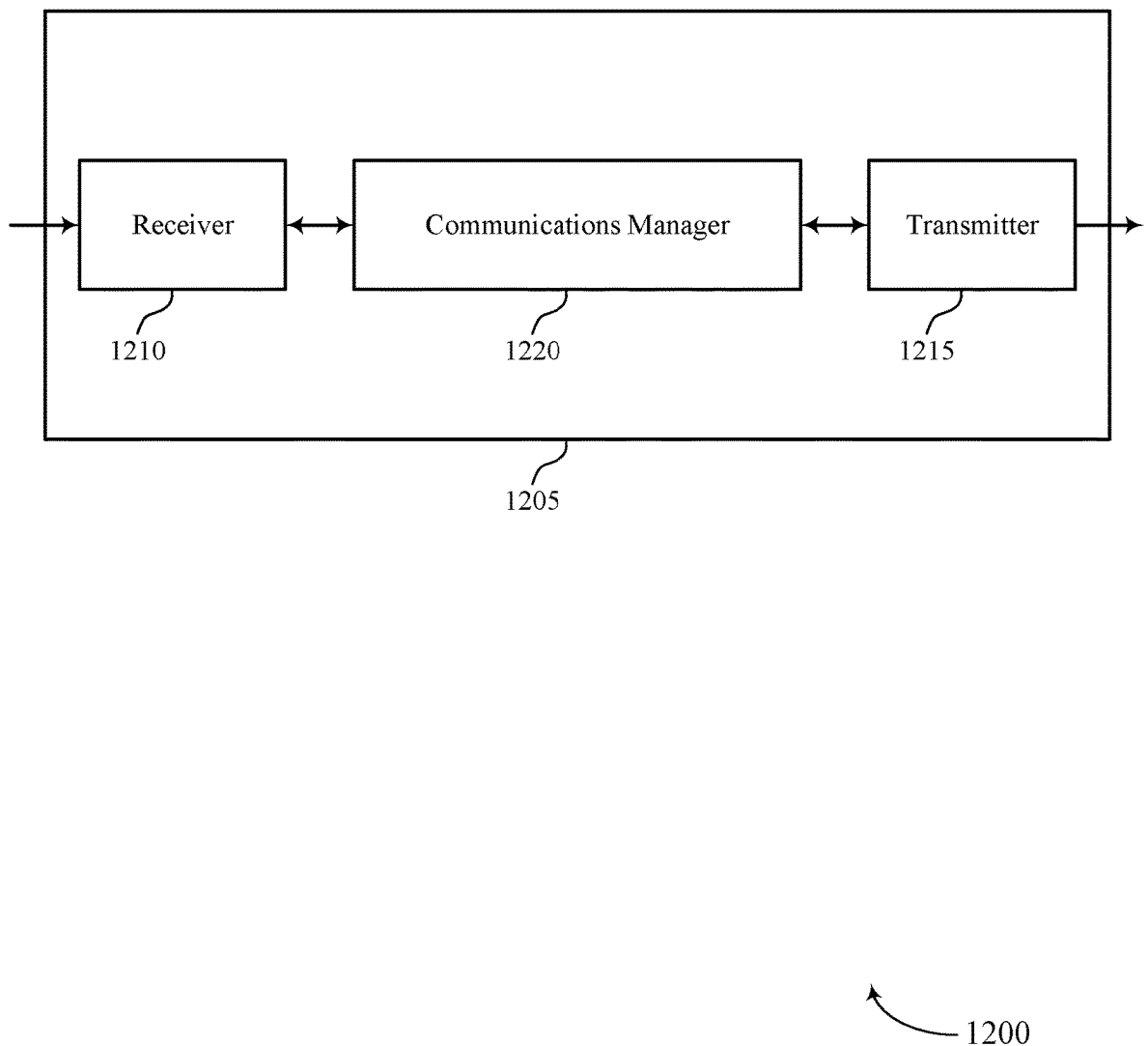
FIGS. 12 and 13 show block diagrams of devices that support spur detection, estimation, and mitigation in accordance with one or more aspects of the present disclosure.

FIG. 12 shows a block diagram 1200 of a device 1205 that supports spur detection, estimation, and mitigation in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations or components thereof may be examples of means for performing various aspects of spur detection, estimation, and mitigation as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor (e.g., referred to as a processor-executable code). If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting)

using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. For example, the communications manager 1220 is capable of, configured to, or operable to support a means for obtaining information indicating one or more spur parameters that correspond to one or more frequency spurs associated with a UE. The communications manager 1220 is capable of, configured to, or operable to support a means for outputting, after reception of the information, a control message indicating a rate matching pattern for one or more subsequent communications for the UE, where the rate matching pattern is based on the one or more spur parameters that correspond to the one or more frequency spurs associated with the UE. The communications manager 1220 is capable of, configured to, or operable to support a means for obtaining or outputting one or more messages in accordance with the rate matching pattern for the UE.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for spur detection, estimation, and mitigation, which may improve throughput, reduce latency, improve the quality of communications, improve demodulation and decoding success, and reduce the impacts of frequency spurs on communications.

Figure 13:
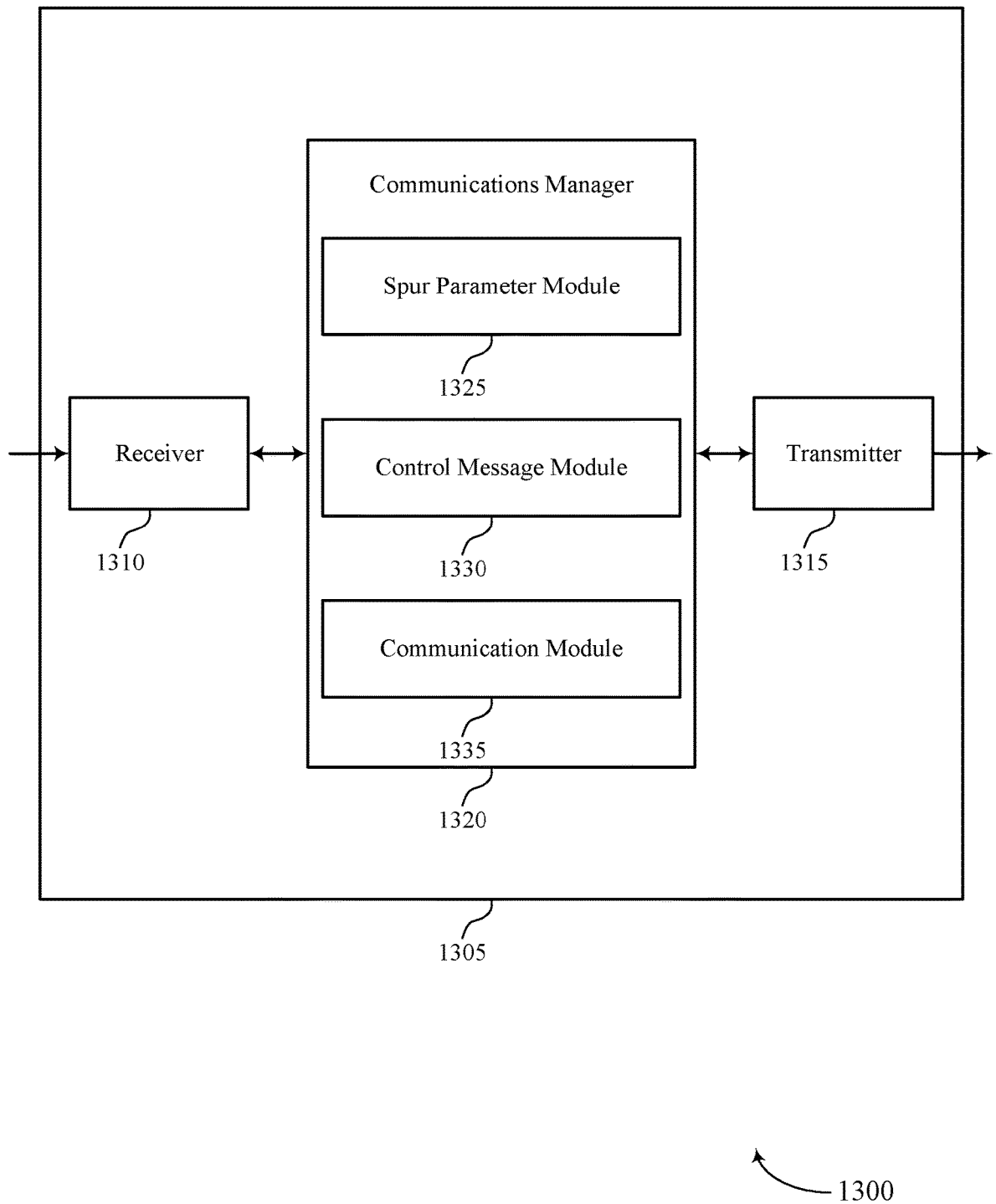

FIG. 13 shows a block diagram 1300 of a device 1305 that supports spur detection, estimation, and mitigation in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one or more components of the device 1305 (e.g., the receiver 1310, the transmitter 1315, the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of spur detection, estimation, and mitigation as described herein. For example, the communications manager 1320 may include a spur parameter module 1325, a control message module 1330, a communication module 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. The spur parameter module 1325 is capable of, configured to, or operable to support a means for obtaining information indicating one or more spur parameters that correspond to one or more frequency spurs associated with a UE. The control message module 1330 is capable of, configured to, or operable to support a means for outputting, after reception of the information, a control message indicating a rate matching pattern for one or more subsequent communications for the UE, where the rate matching pattern is based on the one or more spur parameters that correspond to the one or more frequency spurs associated with the UE. The communication module 1335 is capable of, configured to, or operable to support a means for obtaining or outputting one or more messages in accordance with the rate matching pattern for the UE.

Figure 14:
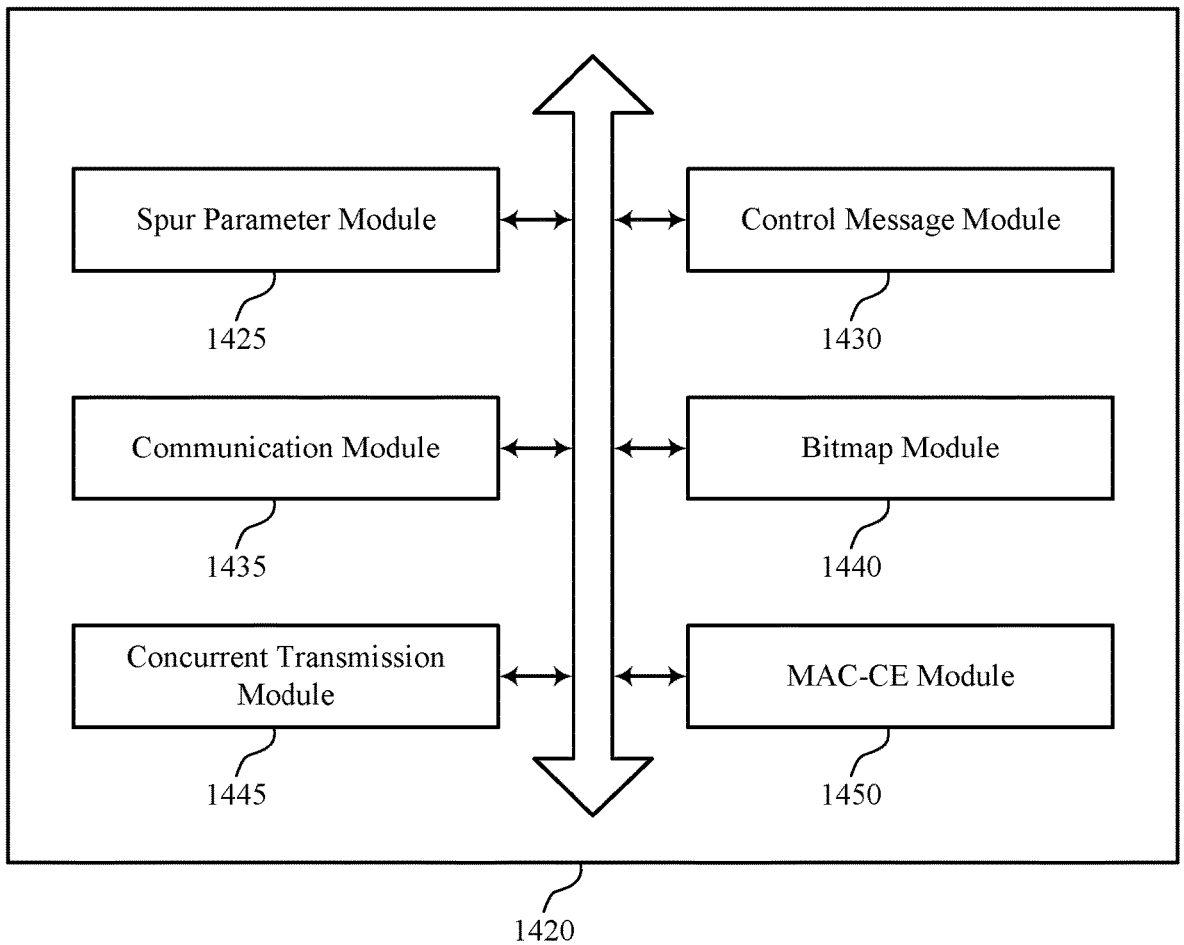
FIG. 14 shows a block diagram of a communications manager that supports spur detection, estimation, and mitigation in accordance with one or more aspects of the present disclosure.

FIG. 14 shows a block diagram 1400 of a communications manager 1420 that supports spur detection, estimation, and mitigation in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of spur detection, estimation, and mitigation as described herein. For example, the communications manager 1420 may include a spur parameter module 1425, a control message module 1430, a communication module 1435, a bitmap module 1440, a concurrent transmission module 1445, a MAC-CE module 1450, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications in accordance with examples as disclosed herein. The spur parameter module 1425 is capable of, configured to, or operable to support a means for obtaining information indicating one or more spur parameters that correspond to one or more frequency spurs associated with a UE. The control message module 1430 is capable of, configured to, or operable to support a means for outputting, after reception of the information, a control message indicating a rate matching pattern for one or more subsequent communications for the UE, where the rate matching pattern is based on the one or more spur parameters that correspond to the one or more frequency spurs associated with the UE. The communication module 1435 is capable of, configured to, or operable to support a means for obtaining or outputting one or more messages in accordance with the rate matching pattern for the UE.

In some examples, the spur parameter module 1425 is capable of, configured to, or operable to support a means for obtaining second information indicating one or more second spur parameters that correspond to one or more additional frequency spurs. In some examples, the control message module 1430 is capable of, configured to, or operable to support a means for outputting, after reception of the second information, a second control message indicating an updated rate matching pattern for the one or more subsequent communications for the UE, where the updated rate matching pattern is based on the one or more second spur parameters.

In some examples, the second control message schedules one or more downlink messages in accordance with the updated rate matching pattern based on the one or more second spur parameters.

In some examples, the updated rate matching pattern is based on one or more MCS values associated with the one or more subsequent communications.

In some examples, to support receiving the information, the spur parameter module 1425 is capable of, configured to, or operable to support a means for obtaining a report including CSF and the information indicating the one or more spur parameters.

In some examples, to support receiving the information, the bitmap module 1440 is capable of, configured to, or operable to support a means for obtaining a bitmap corresponding to the information indicating the one or more spur parameters, where the bitmap indicates one or more component carriers associated with the one or more frequency spurs.

In some examples, the information indicates a BWP index, a serving cell index, a frequency index, or any combination thereof associated with the one or more frequency spurs.

In some examples, the concurrent transmission module 1445 is capable of, configured to, or operable to support a means for obtaining the information indicating the one or more spur parameters that correspond to the one or more frequency spurs, where the one or more frequency spurs are associated with one or more concurrent transmissions via a first FR and a second FR. In some examples, the control message module 1430 is capable of, configured to, or operable to support a means for outputting, after reception of the information, DCI indicating the rate matching pattern, a puncturing pattern, or both for the one or more concurrent transmissions, where the rate matching pattern, the puncturing pattern, or both are based on the one or more spur parameters.

In some examples, the information includes a frequency associated with the one or more frequency spurs, a location associated with the one or more frequency spurs, a type of the one or more frequency spurs, or any combination thereof. In some examples, the type may indicate a static spur, a dynamic spur, or a lack of spurs.

In some examples, to support receiving the information, the spur parameter module 1425 is capable of, configured to, or operable to support a means for obtaining a MAC-CE indicating the one or more spur parameters.

In some examples, the MAC-CE module 1450 is capable of, configured to, or operable to support a means for outputting a MAC-CE that requests the information indicating the one or more spur parameters from the UE.

Figure 15:
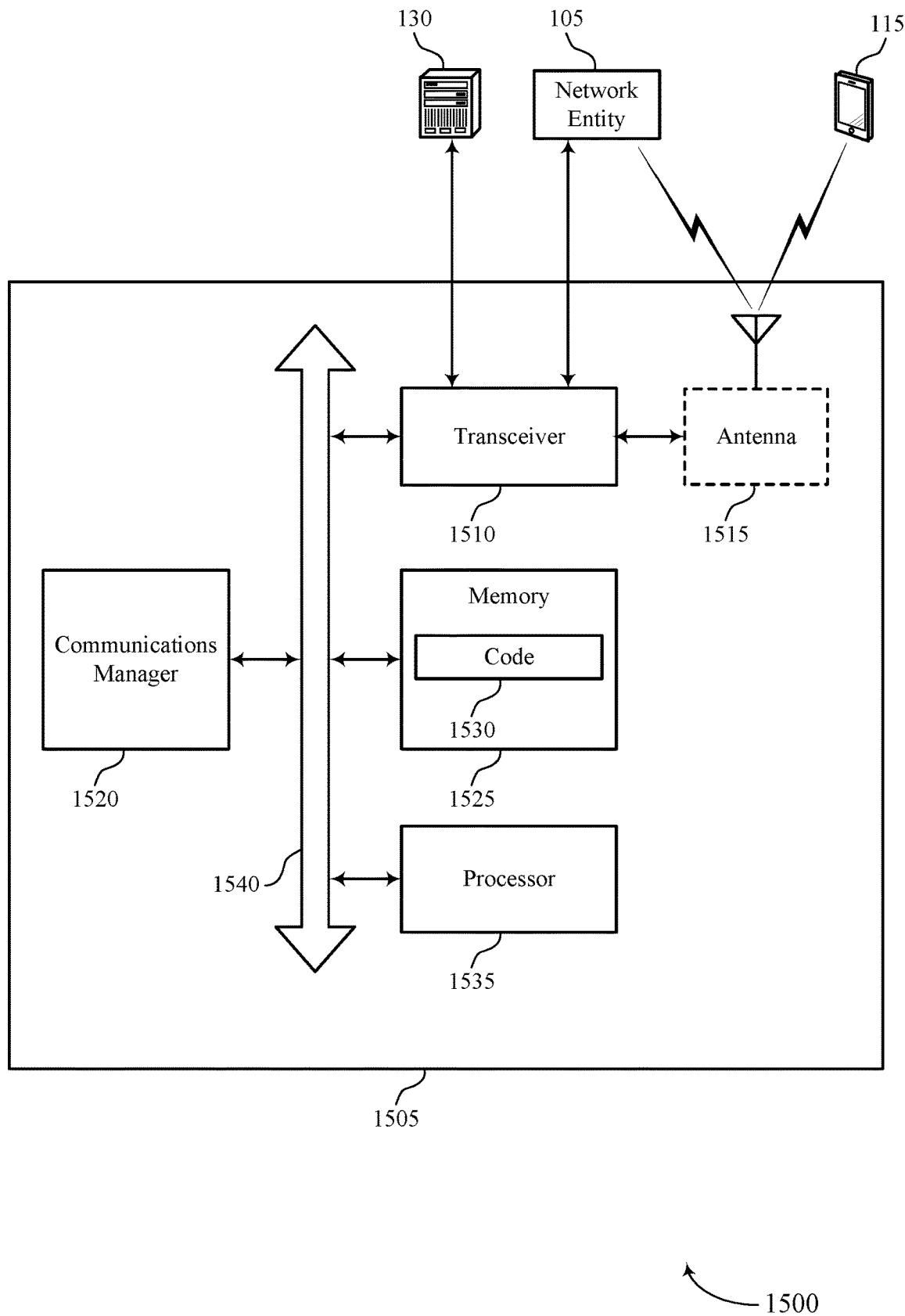
FIG. 15 shows a diagram of a system including a device that supports spur detection, estimation, and mitigation in accordance with one or more aspects of the present disclosure.

FIG. 15 shows a diagram of a system 1500 including a device 1505 that supports spur detection, estimation, and mitigation in accordance with one or more aspects of the present disclosure. The device 1505 may be an example of or include components of a device 1205, a device 1305, or a network entity 105 as described herein. The device 1505 may communicate with other network devices or network equipment such as one or more of the network entities 105, UEs 115, or any combination thereof. The communications may include communications over one or more wired interfaces, over one or more wireless interfaces, or any combination thereof. The device 1505 may include components that support outputting and obtaining communications, such as a communications manager 1520, a transceiver 1510, one or more antennas 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., communication link(s) 125, backhaul communication link(s) 120, a midhaul communication link 162, a fronthaul communication link 168).

The at least one memory 1525 may include RAM, ROM, or any combination thereof. The at least one memory 1525 may store computer-readable, computer-executable, or processor-executable code, such as the code 1530. The code 1530 may include instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may include, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting spur detection, estimation, and mitigation). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. For example, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with one or more other network devices 105, and may include a controller or scheduler for controlling communications with UEs 115 (e.g., in cooperation with the one or more other network devices). In some examples, the communications manager 1520 may support an X2 interface within an LTE/LTE-A wireless communications network technology to provide communication between network entities 105.

The communications manager 1520 may support wireless communications in accordance with examples as disclosed herein. For example, the communications manager 1520 is capable of, configured to, or operable to support a means for obtaining information indicating one or more spur parameters that correspond to one or more frequency spurs associated with a UE. The communications manager 1520 is capable of, configured to, or operable to support a means for outputting, after reception of the information, a control message indicating a rate matching pattern for one or more subsequent communications for the UE, where the rate matching pattern is based on the one or more spur parameters that correspond to the one or more frequency spurs associated with the UE. The communications manager 1520 is capable of, configured to, or operable to support a means for obtaining or outputting one or more messages in accordance with the rate matching pattern for the UE.

By including or configuring the communications manager 1520 in accordance with examples as described herein, the device 1505 may support techniques for spur detection, estimation, and mitigation, which may improve throughput, reduce latency, improve the quality of communications, improve demodulation and decoding success, and reduce the impacts of frequency spurs on communications.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of spur detection, estimation, and mitigation as described herein, or the at least one processor 1535 and the at least one memory 1525 may be otherwise configured to, individually or collectively, perform or support such operations.

Figure 16:
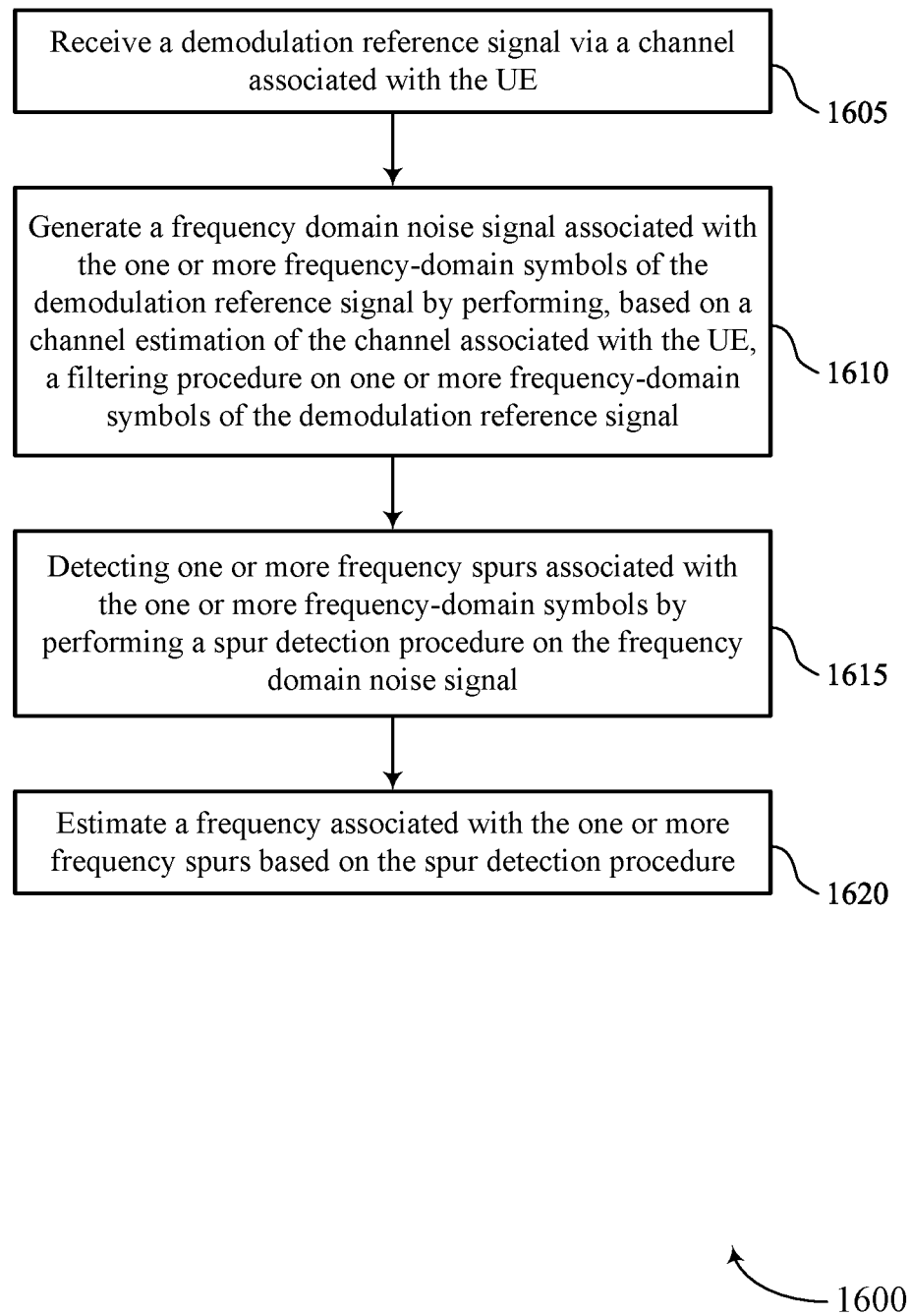
FIGS. 16 through 23 show flowcharts illustrating methods that support spur detection, estimation, and mitigation in accordance with one or more aspects of the present disclosure.

FIG. 16 shows a flowchart illustrating a method 1600 that supports spur detection, estimation, and mitigation in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a DMRS via a channel associated with the UE. The operations of 1605 may be performed in accordance with examples as disclosed herein. In some examples, aspects of the operations of 1605 may be performed by a DMRS component 1025 as described with reference to FIG. 10.

At 1610, the method may include generating a frequency-domain noise signal associated with one or more frequency-domain symbols of the DMRS by performing, based on a channel estimation of the channel associated with the UE, a filtering procedure on the one or more frequency-domain symbols of the DMRS. The operations of 1610 may be performed in accordance with examples as disclosed herein. In some examples, aspects of the operations of 1610 may be performed by a filtering component 1030 as described with reference to FIG. 10.

At 1615, the method may include detecting one or more frequency spurs associated with the one or more frequency-domain symbols by performing a spur detection procedure on the frequency-domain noise signal. The operations of 1615 may be performed in accordance with examples as disclosed herein. In some examples, aspects of the operations of 1615 may be performed by a spur detection component 1035 as described with reference to FIG. 10.

At 1620, the method may include estimating a frequency associated with the one or more frequency spurs based on the spur detection procedure. The operations of 1620 may be performed in accordance with examples as disclosed herein. In some examples, aspects of the operations of 1620 may be performed by a frequency estimation component 1040 as described with reference to FIG. 10.

Figure 17:
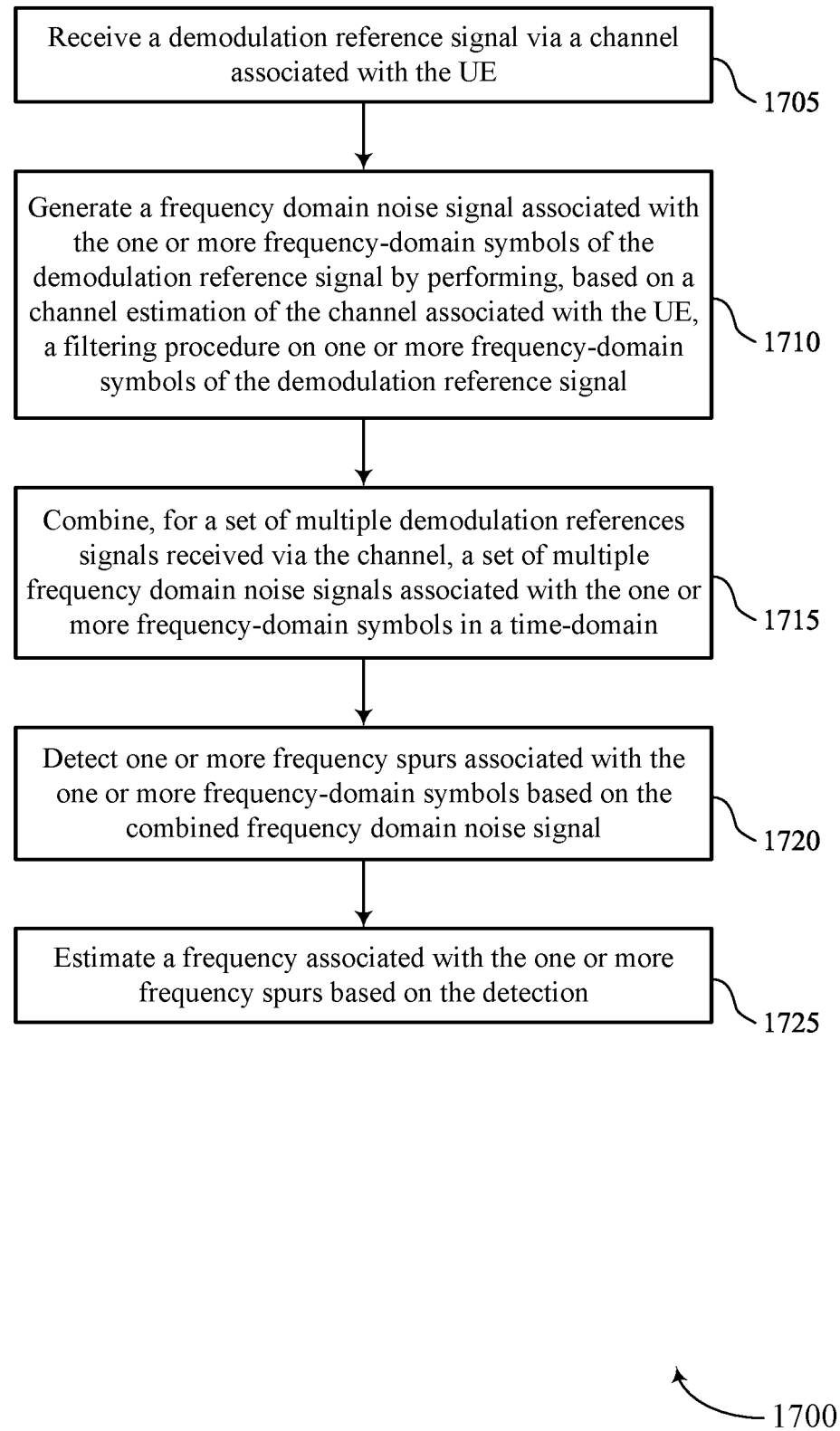

FIG. 17 shows a flowchart illustrating a method 1700 that supports spur detection, estimation, and mitigation in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a DMRS via a channel associated with the UE. The operations of 1705 may be performed in accordance with examples as disclosed herein. In some examples, aspects of the operations of 1705 may be performed by a DMRS component 1025 as described with reference to FIG. 10.

At 1710, the method may include generating a frequency-domain noise signal associated with one or more frequency-domain symbols of the DMRS by performing, based on a channel estimation of the channel associated with the UE, a filtering procedure on the one or more frequency-domain symbols of the DMRS. The operations of 1710 may be performed in accordance with examples as disclosed herein. In some examples, aspects of the operations of 1710 may be performed by a filtering component 1030 as described with reference to FIG. 10.

At 1715, the method may include combining, for a set of multiple demodulation references signals received via the channel, a set of multiple frequency-domain noise signals associated with the one or more frequency-domain symbols in a time-domain. The operations of 1715 may be performed in accordance with examples as disclosed herein. In some examples, aspects of the operations of 1715 may be performed by a spur detection component 1035 as described with reference to FIG. 10.

At 1720, the method may include detecting one or more frequency spurs associated with the one or more frequency-domain symbols based on the combined frequency-domain noise signal. The operations of 1720 may be performed in accordance with examples as disclosed herein. In some examples, aspects of the operations of 1720 may be performed by a spur detection component 1035 as described with reference to FIG. 10.

At 1725, the method may include estimating a frequency associated with the one or more frequency spurs based on the detection. The operations of 1725 may be performed in accordance with examples as disclosed herein. In some examples, aspects of the operations of 1725 may be performed by a frequency estimation component 1040 as described with reference to FIG. 10.

Figure 18:
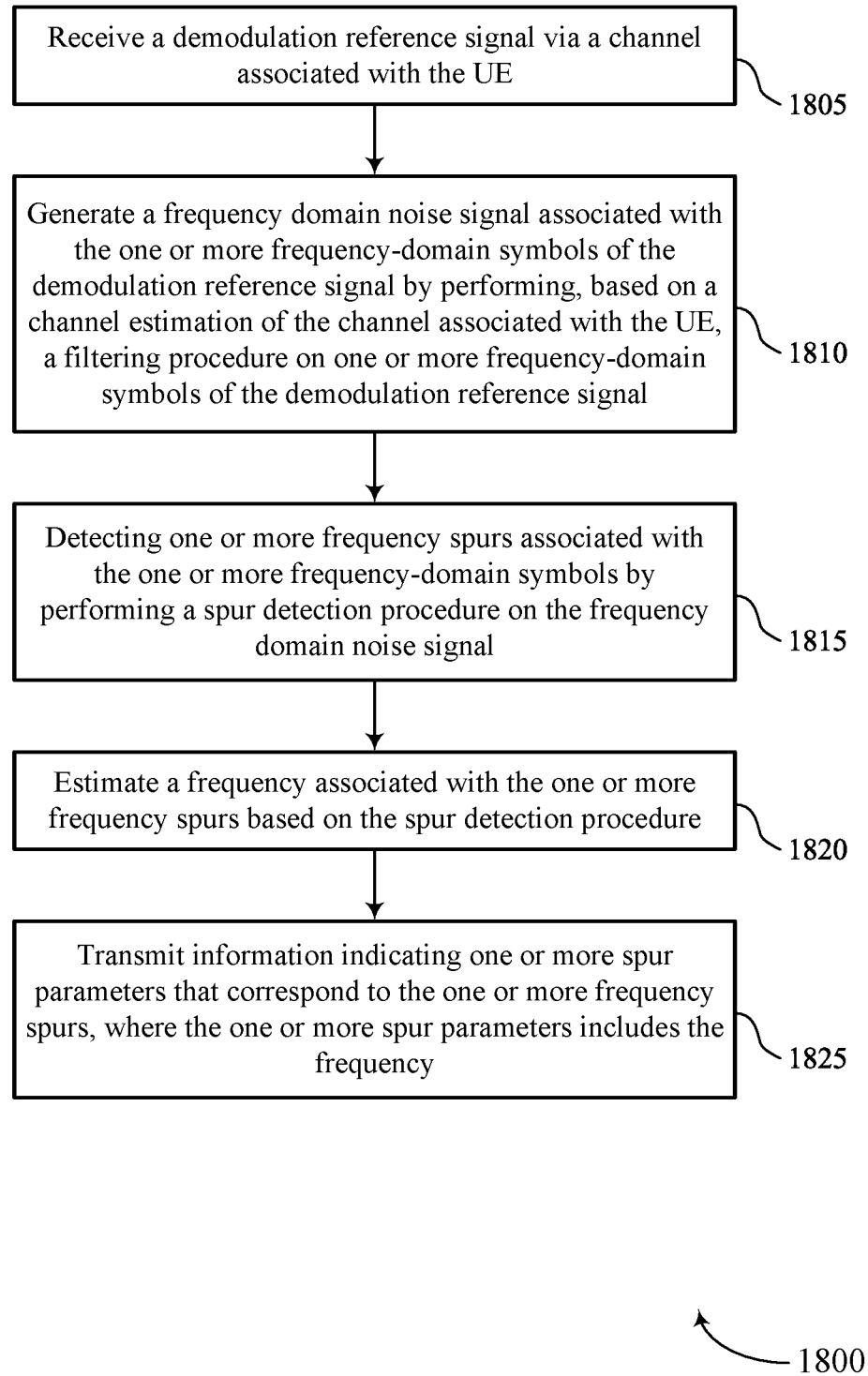

FIG. 18 shows a flowchart illustrating a method 1800 that supports spur detection, estimation, and mitigation in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a DMRS via a channel associated with the UE. The operations of 1805 may be performed in accordance with examples as disclosed herein. In some examples, aspects of the operations of 1805 may be performed by a DMRS component 1025 as described with reference to FIG. 10.

At 1810, the method may include generating a frequency-domain noise signal associated with one or more frequency-domain symbols of the DMRS by performing, based on a channel estimation of the channel associated with the UE, a filtering procedure on the one or more frequency-domain symbols of the DMRS. The operations of 1810 may be performed in accordance with examples as disclosed herein. In some examples, aspects of the operations of 1810 may be performed by a filtering component 1030 as described with reference to FIG. 10.

At 1815, the method may include detecting one or more frequency spurs associated with the one or more frequency-domain symbols by performing a spur detection procedure on the frequency-domain noise signal. The operations of 1815 may be performed in accordance with examples as disclosed herein. In some examples, aspects of the operations of 1815 may be performed by a spur detection component 1035 as described with reference to FIG. 10.

At 1820, the method may include estimating a frequency associated with the one or more frequency spurs based on the spur detection procedure. The operations of 1820 may be performed in accordance with examples as disclosed herein. In some examples, aspects of the operations of 1820 may be performed by a frequency estimation component 1040 as described with reference to FIG. 10.

At 1825, the method may include transmitting information indicating one or more spur parameters that correspond to the one or more frequency spurs, where the one or more spur parameters includes the frequency. The operations of 1825 may be performed in accordance with examples as disclosed herein. In some examples, aspects of the operations of 1825 may be performed by a spur parameter component 1045 as described with reference to FIG. 10.

Figure 19:
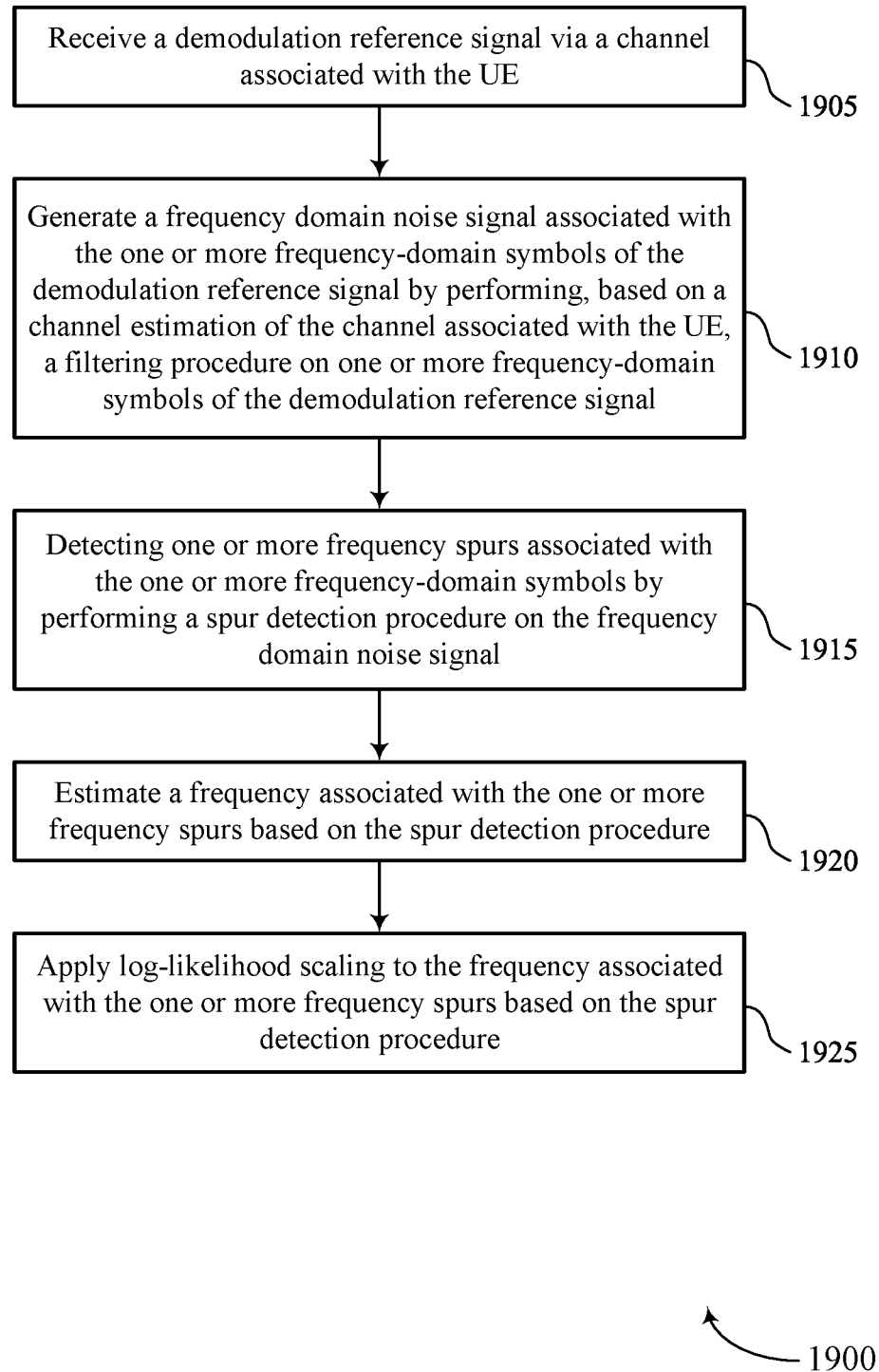

FIG. 19 shows a flowchart illustrating a method 1900 that supports spur detection, estimation, and mitigation in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving a DMRS via a channel associated with the UE. The operations of 1905 may be performed in accordance with examples as disclosed herein. In some examples, aspects of the operations of 1905 may be performed by a DMRS component 1025 as described with reference to FIG. 10.

At 1910, the method may include generating a frequency-domain noise signal associated with one or more frequency-domain symbols of the DMRS by performing, based on a channel estimation of the channel associated with the UE, a filtering procedure on the one or more frequency-domain symbols of the DMRS. The operations of 1910 may be performed in accordance with examples as disclosed herein. In some examples, aspects of the operations of 1910 may be performed by a filtering component 1030 as described with reference to FIG. 10.

At 1915, the method may include detecting one or more frequency spurs associated with the one or more frequency-domain symbols by performing a spur detection procedure on the frequency-domain noise signal. The operations of 1915 may be performed in accordance with examples as disclosed herein. In some examples, aspects of the operations of 1915 may be performed by a spur detection component 1035 as described with reference to FIG. 10.

At 1920, the method may include estimating a frequency associated with the one or more frequency spurs based on the spur detection procedure. The operations of 1920 may be performed in accordance with examples as disclosed herein. In some examples, aspects of the operations of 1920 may be performed by a frequency estimation component 1040 as described with reference to FIG. 10.

At 1925, the method may include applying log-likelihood scaling to the frequency associated with the one or more frequency spurs based on the spur detection procedure. The operations of 1925 may be performed in accordance with examples as disclosed herein. In some examples, aspects of the operations of 1925 may be performed by an LLR scaling component 1060 as described with reference to FIG. 10.

Figure 20:
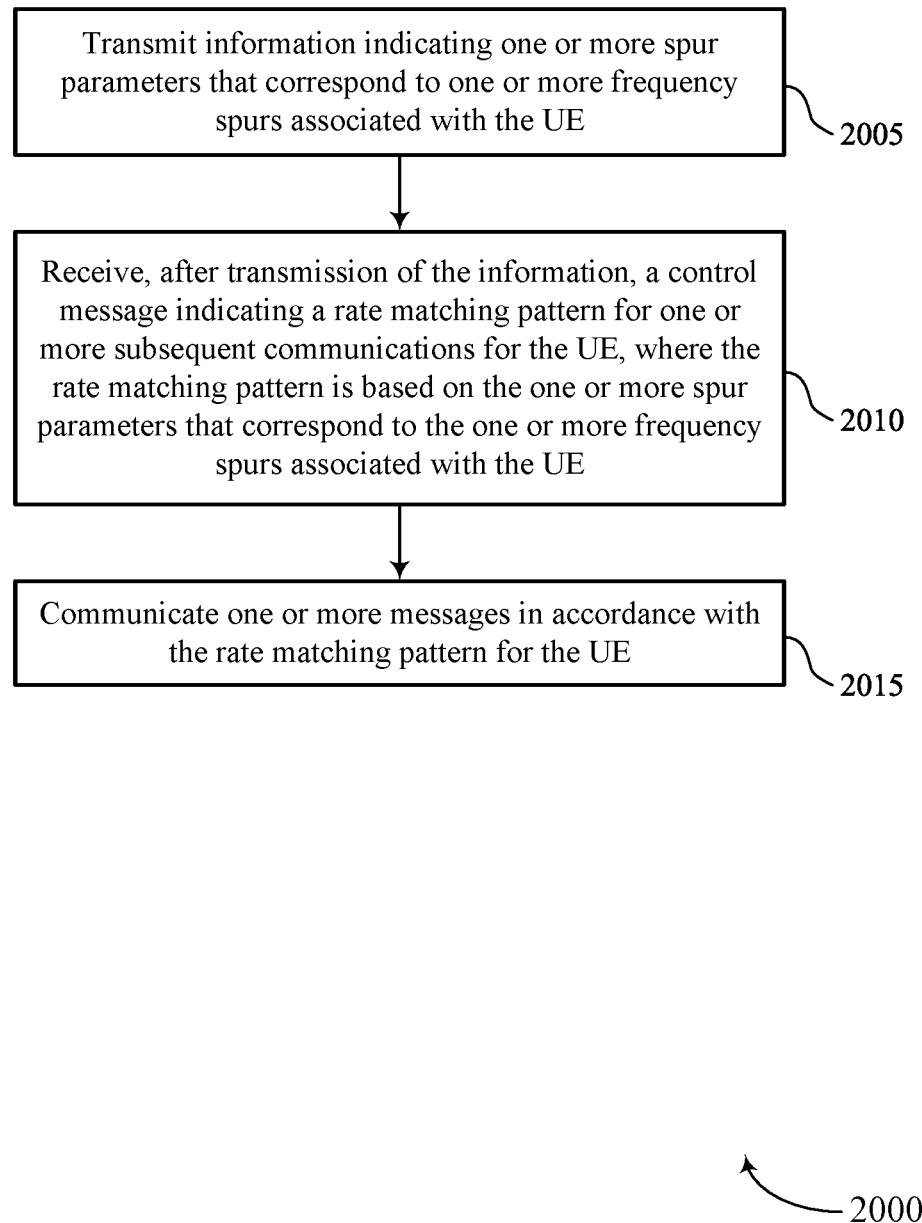

FIG. 20 shows a flowchart illustrating a method 2000 that supports spur detection, estimation, and mitigation in accordance with one or more aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include transmitting information indicating one or more spur parameters that correspond to one or more frequency spurs associated with the UE. The operations of 2005 may be performed in accordance with examples as disclosed herein. In some examples, aspects of the operations of 2005 may be performed by a spur parameter component 1045 as described with reference to FIG. 10.

At 2010, the method may include receiving, after transmission of the information, a control message indicating a rate matching pattern for one or more subsequent communications for the UE, where the rate matching pattern is based on the one or more spur parameters that correspond to the one or more frequency spurs associated with the UE. The operations of 2010 may be performed in accordance with examples as disclosed herein. In some examples, aspects of the operations of 2010 may be performed by a control message component 1050 as described with reference to FIG. 10.

At 2015, the method may include communicating one or more messages in accordance with the rate matching pattern for the UE. The operations of 2015 may be performed in accordance with examples as disclosed herein. In some examples, aspects of the operations of 2015 may be performed by a communication component 1055 as described with reference to FIG. 10.

Figure 21:
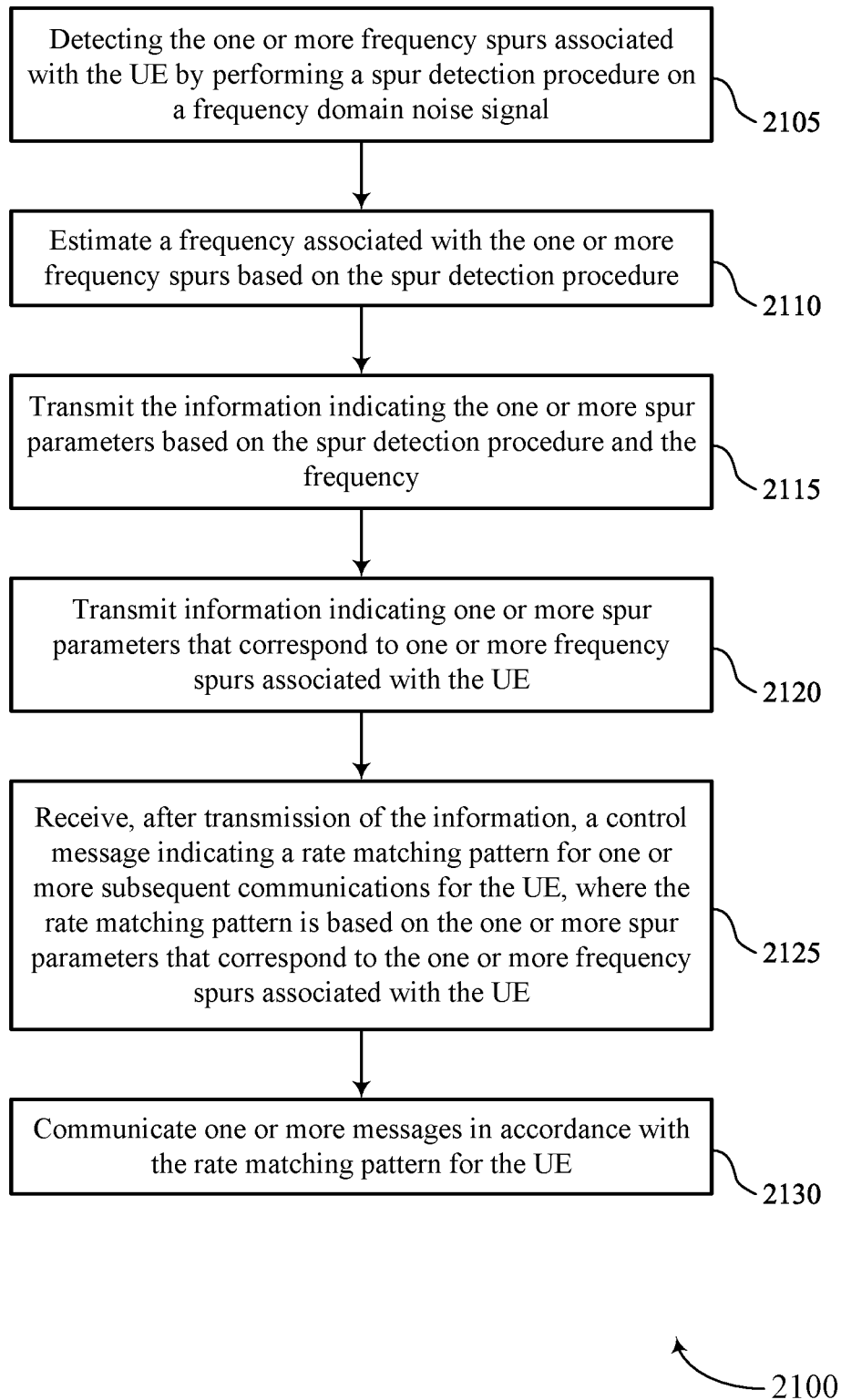

FIG. 21 shows a flowchart illustrating a method 2100 that supports spur detection, estimation, and mitigation in accordance with one or more aspects of the present disclosure. The operations of the method 2100 may be implemented by a UE or its components as described herein. For example, the operations of the method 2100 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2105, the method may include detecting the one or more frequency spurs associated with the UE by performing a spur detection procedure on a frequency-domain noise signal. The operations of 2105 may be performed in accordance with examples as disclosed herein. In some examples, aspects of the operations of 2105 may be performed by a spur detection component 1035 as described with reference to FIG. 10.

At 2110, the method may include estimating a frequency associated with the one or more frequency spurs based on the spur detection procedure. The operations of 2110 may be performed in accordance with examples as disclosed herein. In some examples, aspects of the operations of 2110 may be performed by a frequency estimation component 1040 as described with reference to FIG. 10.

At 2115, the method may include transmitting the information indicating the one or more spur parameters based on the spur detection procedure and the frequency. The operations of 2115 may be performed in accordance with examples as disclosed herein. In some examples, aspects of the operations of 2115 may be performed by a spur parameter component 1045 as described with reference to FIG. 10.

At 2120, the method may include transmitting information indicating one or more spur parameters that correspond to one or more frequency spurs associated with the UE. The operations of 2120 may be performed in accordance with examples as disclosed herein. In some examples, aspects of the operations of 2120 may be performed by a spur parameter component 1045 as described with reference to FIG. 10.

At 2125, the method may include receiving, after transmission of the information, a control message indicating a rate matching pattern for one or more subsequent communications for the UE, where the rate matching pattern is based on the one or more spur parameters that correspond to the one or more frequency spurs associated with the UE. The operations of 2125 may be performed in accordance with examples as disclosed herein. In some examples, aspects of the operations of 2125 may be performed by a control message component 1050 as described with reference to FIG. 10.

At 2130, the method may include communicating one or more messages in accordance with the rate matching pattern for the UE. The operations of 2130 may be performed in accordance with examples as disclosed herein. In some examples, aspects of the operations of 2130 may be performed by a communication component 1055 as described with reference to FIG. 10.

Figure 22:
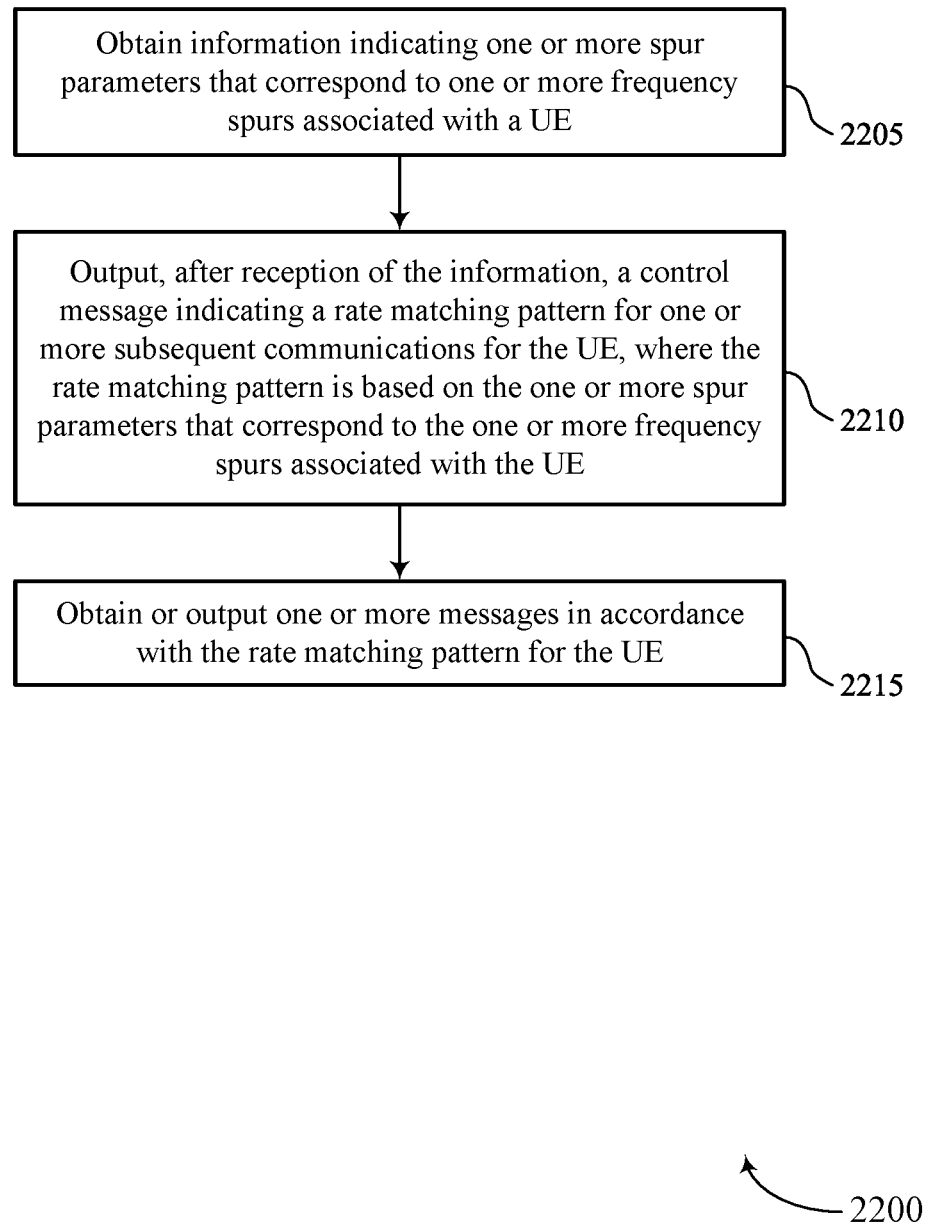

FIG. 22 shows a flowchart illustrating a method 2200 that supports spur detection, estimation, and mitigation in accordance with one or more aspects of the present disclosure. The operations of the method 2200 may be implemented by a network entity or its components as described herein. For example, the operations of the method 2200 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2205, the method may include obtaining information indicating one or more spur parameters that correspond to one or more frequency spurs associated with a UE. The operations of 2205 may be performed in accordance with examples as disclosed herein. In some examples, aspects of the operations of 2205 may be performed by a spur parameter module 1425 as described with reference to FIG. 14.

At 2210, the method may include outputting, after reception of the information, a control message indicating a rate matching pattern for one or more subsequent communications for the UE, where the rate matching pattern is based on the one or more spur parameters that correspond to the one or more frequency spurs associated with the UE. The operations of 2210 may be performed in accordance with examples as disclosed herein. In some examples, aspects of the operations of 2210 may be performed by a control message module 1430 as described with reference to FIG. 14.

At 2215, the method may include obtaining or outputting one or more messages in accordance with the rate matching pattern for the UE. The operations of 2215 may be performed in accordance with examples as disclosed herein. In some examples, aspects of the operations of 2215 may be performed by a communication module 1435 as described with reference to FIG. 14.

Figure 23:
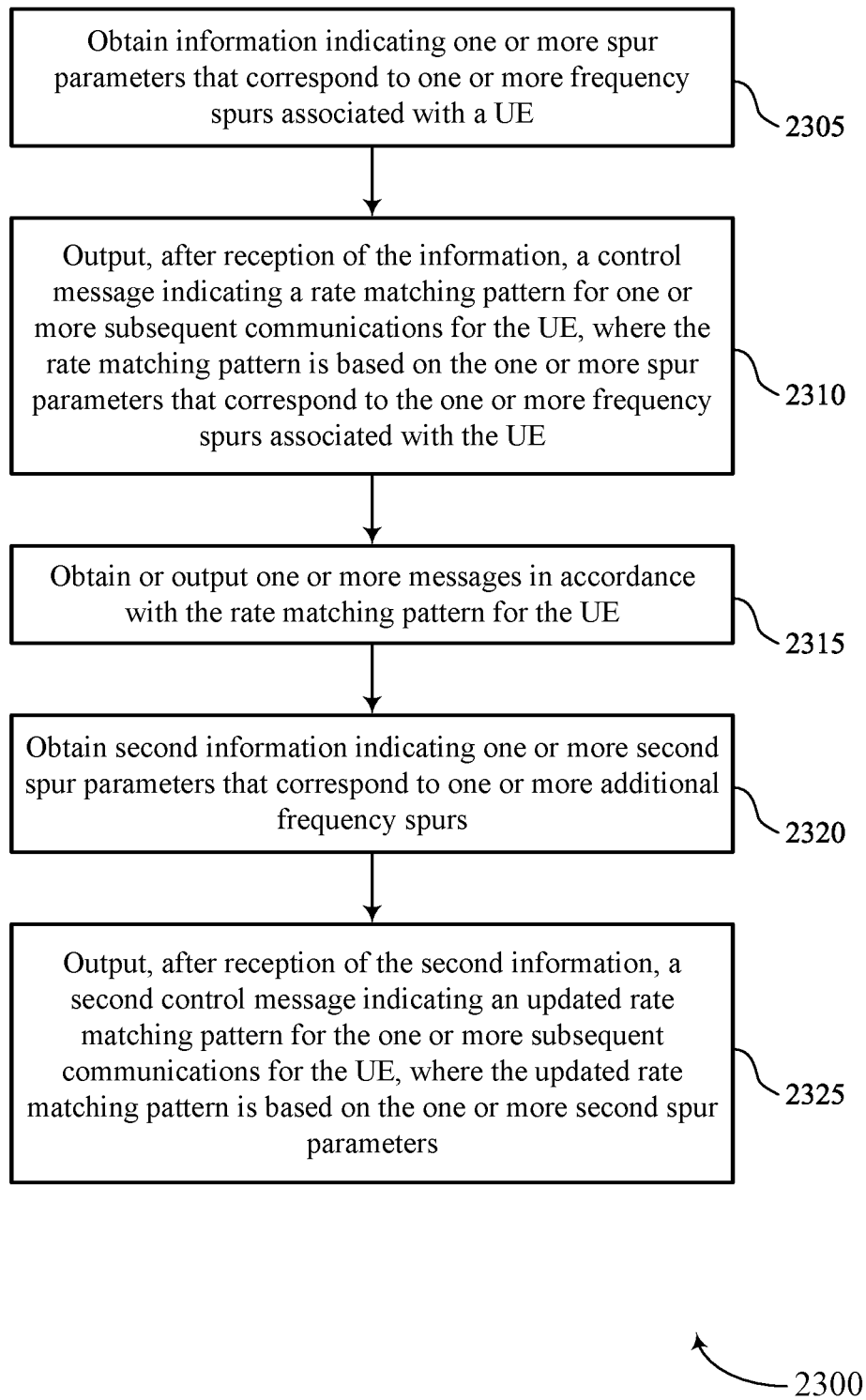

FIG. 23 shows a flowchart illustrating a method 2300 that supports spur detection, estimation, and mitigation in accordance with one or more aspects of the present disclosure. The operations of the method 2300 may be implemented by a network entity or its components as described herein. For example, the operations of the method 2300 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2305, the method may include obtaining information indicating one or more spur parameters that correspond to one or more frequency spurs associated with a UE. The operations of 2305 may be performed in accordance with examples as disclosed herein. In some examples, aspects of the operations of 2305 may be performed by a spur parameter module 1425 as described with reference to FIG. 14.

At 2310, the method may include outputting, after reception of the information, a control message indicating a rate matching pattern for one or more subsequent communications for the UE, where the rate matching pattern is based on the one or more spur parameters that correspond to the one or more frequency spurs associated with the UE. The operations of 2310 may be performed in accordance with examples as disclosed herein. In some examples, aspects of the operations of 2310 may be performed by a control message module 1430 as described with reference to FIG. 14.

At 2315, the method may include obtaining or outputting one or more messages in accordance with the rate matching pattern for the UE. The operations of 2315 may be performed in accordance with examples as disclosed herein. In some examples, aspects of the operations of 2315 may be performed by a communication module 1435 as described with reference to FIG. 14.

At 2320, the method may include obtaining second information indicating one or more second spur parameters that correspond to one or more additional frequency spurs. The operations of 2320 may be performed in accordance with examples as disclosed herein. In some examples, aspects of the operations of 2320 may be performed by a spur parameter module 1425 as described with reference to FIG. 14.

At 2325, the method may include outputting, after reception of the second information, a second control message indicating an updated rate matching pattern for the one or more subsequent communications for the UE, where the updated rate matching pattern is based on the one or more second spur parameters. The operations of 2325 may be performed in accordance with examples as disclosed herein. In some examples, aspects of the operations of 2325 may be performed by a control message module 1430 as described with reference to FIG. 14.

The following provides an overview of aspects of the present disclosure:

Aspect 1: A method for wireless communications at a UE, comprising: receiving a DMRS via a channel associated with the UE; generating a frequency domain noise signal associated with one or more frequency-domain symbols of the DMRS by performing, based at least in part on a channel estimation of the channel associated with the UE, a filtering procedure on the one or more frequency-domain symbols of the DMRS; detecting one or more frequency spurs associated with the one or more frequency-domain symbols by performing a spur detection procedure on the frequency domain noise signal; and estimating a frequency associated with the one or more frequency spurs based at least in part on the spur detection procedure.

Aspect 2: The method of aspect 1, wherein detecting the one or more frequency spurs comprises: combining, for a plurality of demodulation references signals received via the channel, a plurality of frequency domain noise signals associated with the one or more frequency-domain symbols in a time-domain; and detecting the one or more frequency spurs associated with the one or more frequency-domain symbols based at least in part on the combined frequency domain noise signal.

Aspect 3: The method of aspect 2, wherein detecting the one or more frequency spurs comprises: detecting the one or more frequency spurs associated with the one or more frequency-domain symbols based at least in part on a combined frequency domain noise signals satisfying a frequency threshold.

Aspect 4: The method of any of aspects 1 through 3, wherein estimating the frequency associated with the one or more frequency spurs comprises: determining a set of frequency-domain kernels or a set of time-domain kernels, wherein a range of frequencies associated with the set of frequency-domain kernels or a range of times associated with the set of time-domain kernels is based at least in part on a subcarrier spacing centered around a frequency spur of the one or more frequency spurs, and wherein the set of frequency-domain kernels are associated with a uniform spacing or a non-uniform spacing over the range of frequencies or the set of time-domain kernels are associated with a uniform spacing or a non-uniform spacing over the range of times; and estimating the frequency associated with the one or more frequency spurs based at least in part on one or more frequency-domain kernels of the set of frequency-domain kernels or one or more time-domain kernels of the set of time-domain kernels associated with the one or more frequency spurs.

Aspect 5: The method of any of aspects 1 through 4, wherein estimating the frequency associated with the one or more frequency spurs comprises: estimating, in accordance with a sampling function, a frequency associated with a frequency spur of the one or more frequency spurs based at least in part on an index associated with the frequency spur being within one index of a maximum frequency.

Aspect 6: The method of any of aspects 1 through 5, wherein estimating the frequency associated with the one or more frequency spurs comprises: transmitting information indicating one or more spur parameters that correspond to the one or more frequency spurs, wherein the one or more spur parameters includes the frequency.

Aspect 7: The method of any of aspects 1 through 6, further comprising: applying log-likelihood scaling to the frequency associated with the one or more frequency spurs based at least in part on the spur detection procedure.

Aspect 8: The method of aspect 7, wherein log-likelihood ratios associated with the frequency are limited to a range for the log-likelihood scaling based at least in part on one or more saturation values.

Aspect 9: The method of any of aspects 1 through 8, further comprising: applying a noise mitigation procedure to the DMRS based at least in part on the spur detection procedure, wherein the one or more frequency-domain symbols are excluded from the noise mitigation procedure.

Aspect 10: A method for wireless communications at a UE, comprising: transmitting information indicating one or more spur parameters that correspond to one or more frequency spurs associated with the UE; receiving, after transmission of the information, a control message indicating a rate matching pattern for one or more subsequent communications for the UE, wherein the rate matching pattern is based at least in part on the one or more spur parameters that correspond to the one or more frequency spurs associated with the UE; and communicating one or more messages in accordance with the rate matching pattern for the UE.

Aspect 11: The method of aspect 10, further comprising: detecting one or more additional frequency spurs associated with the UE; transmitting second information indicating one or more second spur parameters that correspond to the one or more additional frequency spurs; and receiving, after transmission of the second information, a second control message indicating an updated rate matching pattern for the one or more subsequent communications for the UE, wherein the updated rate matching pattern is based at least in part on the one or more second spur parameters.

Aspect 12: The method of aspect 11, wherein the second control message schedules one or more downlink messages in accordance with the updated rate matching pattern based at least in part on the one or more second spur parameters.

Aspect 13: The method of any of aspects 11 through 12, wherein the updated rate matching pattern is based at least in part on one or more MCS values associated with the one or more subsequent communications.

Aspect 14: The method of any of aspects 10 through 13, wherein transmitting the information comprises: transmitting a report comprising CSF and the information indicating the one or more spur parameters.

Aspect 15: The method of any of aspects 10 through 14, wherein transmitting the information comprises: transmitting a bitmap corresponding to the information indicating the one or more spur parameters, wherein the bitmap indicates one or more component carriers associated with the one or more frequency spurs.

Aspect 16: The method of any of aspects 10 through 15, wherein the information indicates a BWP index, a serving cell index, a frequency index, or any combination thereof associated with the one or more frequency spurs.

Aspect 17: The method of any of aspects 10 through 16, further comprising: transmitting the information indicating the one or more spur parameters that correspond to the one or more frequency spurs, wherein the one or more frequency spurs are associated with one or more concurrent transmissions via a first FR and a second FR; and receiving, after transmission of the information, DCI indicating the rate matching pattern, a puncturing pattern, or both for the one or more concurrent transmissions, wherein the rate matching pattern, the puncturing pattern, or both are based at least in part on the one or more spur parameters.

Aspect 18: The method of any of aspects 10 through 17, wherein the information comprises a frequency associated with the one or more frequency spurs, a location associated with the one or more frequency spurs, a type of the one or more frequency spurs, or any combination thereof, the type may indicate a static spur, a dynamic spur, or a lack of spurs.

Aspect 19: The method of any of aspects 10 through 18, wherein transmitting the information comprises: transmitting a MAC-CE indicating the one or more spur parameters.

Aspect 20: The method of any of aspects 10 through 19, further comprising: receiving a MAC-CE that requests the information indicating the one or more spur parameters from the UE.

Aspect 21: The method of any of aspects 10 through 20, further comprising: detecting the one or more frequency spurs associated with the UE by performing a spur detection procedure on a frequency domain noise signal; estimating a frequency associated with the one or more frequency spurs based at least in part on the spur detection procedure; and transmitting the information indicating the one or more spur parameters based at least in part on the spur detection procedure and the frequency.

Aspect 22: A method for wireless communications at a network entity, comprising: obtaining information indicating one or more spur parameters that correspond to one or more frequency spurs associated with a UE; outputting, after reception of the information, a control message indicating a rate matching pattern for one or more subsequent communications for the UE, wherein the rate matching pattern is based at least in part on the one or more spur parameters that correspond to the one or more frequency spurs associated with the UE; and obtaining or outputting one or more messages in accordance with the rate matching pattern for the UE.

Aspect 23: The method of aspect 22, further comprising: obtaining second information indicating one or more second spur parameters that correspond to one or more additional frequency spurs; and outputting, after reception of the second information, a second control message indicating an updated rate matching pattern for the one or more subsequent communications for the UE, wherein the updated rate matching pattern is based at least in part on the one or more second spur parameters.

Aspect 24: The method of aspect 23, wherein the second control message schedules one or more downlink messages in accordance with the updated rate matching pattern based at least in part on the one or more second spur parameters.

Aspect 25: The method of any of aspects 23 through 24, wherein the updated rate matching pattern is based at least in part on one or more MCS values associated with the one or more subsequent communications.

Aspect 26: The method of any of aspects 22 through 25, wherein receiving the information comprises: obtaining a report comprising CSF and the information indicating the one or more spur parameters.

Aspect 27: The method of any of aspects 22 through 26, wherein receiving the information comprises: obtaining a bitmap corresponding to the information indicating the one or more spur parameters, wherein the bitmap indicates one or more component carriers associated with the one or more frequency spurs.

Aspect 28: The method of any of aspects 22 through 27, wherein the information indicates a BWP index, a serving cell index, a frequency index, or any combination thereof associated with the one or more frequency spurs.

Aspect 29: The method of any of aspects 22 through 28, further comprising: obtaining the information indicating the one or more spur parameters that correspond to the one or more frequency spurs, wherein the one or more frequency spurs are associated with one or more concurrent transmissions via a first FR and a second FR; and outputting, after reception of the information, DCI indicating the rate matching pattern, a puncturing pattern, or both for the one or more concurrent transmissions, wherein the rate matching pattern, the puncturing pattern, or both are based at least in part on the one or more spur parameters.

Aspect 30: The method of any of aspects 22 through 29, wherein the information comprises a frequency associated with the one or more frequency spurs, a location associated with the one or more frequency spurs, a type of the one or more frequency spurs, or any combination thereof, the type may indicate a static spur, a dynamic spur, or a lack of spurs.

Aspect 31: The method of any of aspects 22 through 30, wherein receiving the information comprises: obtaining a MAC-CE indicating the one or more spur parameters.

Aspect 32: The method of any of aspects 22 through 31, further comprising: outputting a MAC-CE that requests the information indicating the one or more spur parameters from the UE.

Aspect 33: A UE for wireless communications, comprising one or more memories storing processor-executable code, and one or more processors coupled with the one or more memories and individually or collectively operable to execute the code to cause the UE to perform a method of any of aspects 1 through 9.

Aspect 34: A UE for wireless communications, comprising at least one means for performing a method of any of aspects 1 through 9.

Aspect 35: A non-transitory computer-readable medium storing code for wireless communications, the code comprising instructions executable by one or more processors to perform a method of any of aspects 1 through 9.

Aspect 36: A UE for wireless communications, comprising one or more memories storing processor-executable code, and one or more processors coupled with the one or more memories and individually or collectively operable to execute the code to cause the UE to perform a method of any of aspects 10 through 21.

Aspect 37: A UE for wireless communications, comprising at least one means for performing a method of any of aspects 10 through 21.

Aspect 38: A non-transitory computer-readable medium storing code for wireless communications, the code comprising instructions executable by one or more processors to perform a method of any of aspects 10 through 21.

Aspect 39: A network entity for wireless communications, comprising one or more memories storing processor-executable code, and one or more processors coupled with the one or more memories and individually or collectively operable to execute the code to cause the network entity to perform a method of any of aspects 22 through 32.

Aspect 40: A network entity for wireless communications, comprising at least one means for performing a method of any of aspects 22 through 32.

Aspect 41: A non-transitory computer-readable medium storing code for wireless communications, the code comprising instructions executable by one or more processors to perform a method of any of aspects 22 through 32.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
    one or more memories storing processor-executable code; and
    one or more processors coupled with the one or more memories and individually or collectively operable to execute the code to cause the UE to:
        transmit information indicating one or more spur parameters that correspond to one or more frequency spurs associated with the UE;
        receive, after transmission of the information, a control message indicating a rate matching pattern for one or more subsequent communications for the UE, wherein the rate matching pattern is based at least in part on the one or more spur parameters that correspond to the one or more frequency spurs associated with the UE; and
        communicate one or more messages in accordance with the rate matching pattern for the UE.

2. The UE of claim 1, wherein the one or more processors are individually or collectively further operable to execute the code to cause the UE to:
    detect one or more additional frequency spurs associated with the UE;
    transmit second information indicating one or more second spur parameters that correspond to the one or more additional frequency spurs; and
    receive, after transmission of the second information, a second control message indicating an updated rate matching pattern for the one or more subsequent communications for the UE, wherein the updated rate matching pattern is based at least in part on the one or more second spur parameters.

3. The UE of claim 2, wherein the second control message schedules one or more downlink messages in accordance with the updated rate matching pattern based at least in part on the one or more second spur parameters.

4. The UE of claim 2, wherein the updated rate matching pattern is based at least in part on one or more modulation and coding scheme values associated with the one or more subsequent communications.

5. The UE of claim 1, wherein, to transmit the information, the one or more processors are individually or collectively operable to execute the code to cause the UE to:
    transmit a report comprising channel state feedback and the information indicating the one or more spur parameters.

6. The UE of claim 1, wherein, to transmit the information, the one or more processors are individually or collectively operable to execute the code to cause the UE to:
    transmit a bitmap corresponding to the information indicating the one or more spur parameters, wherein the bitmap indicates one or more component carriers associated with the one or more frequency spurs.

7. The UE of claim 1, wherein the information indicates a bandwidth part index, a serving cell index, a frequency index, or any combination thereof associated with the one or more frequency spurs.

8. The UE of claim 1, wherein the one or more processors are individually or collectively further operable to execute the code to cause the UE to:
    transmit the information indicating the one or more spur parameters that correspond to the one or more frequency spurs, wherein the one or more frequency spurs are associated with one or more concurrent transmissions via a first frequency range and a second frequency range; and
    receive, after transmission of the information, downlink control information indicating the rate matching pattern, a puncturing pattern, or both for the one or more concurrent transmissions, wherein the rate matching pattern, the puncturing pattern, or both are based at least in part on the one or more spur parameters.

9. The UE of claim 1, wherein the information comprises a frequency associated with the one or more frequency spurs, a location associated with the one or more frequency spurs, a type of the one or more frequency spurs, or any combination thereof, wherein the type indicates a static spur, a dynamic spur, or a lack of spurs.

10. The UE of claim 1, wherein, to transmit the information, the one or more processors are individually or collectively operable to execute the code to cause the UE to:
transmit a medium access control (MAC) control element (MAC-CE) indicating the one or more spur parameters.

11. The UE of claim 1, wherein the one or more processors are individually or collectively further operable to execute the code to cause the UE to:
receive a MAC-CE that requests the information indicating the one or more spur parameters from the UE.

12. The UE of claim 1, wherein the one or more processors are individually or collectively further operable to execute the code to cause the UE to:
detect the one or more frequency spurs associated with the UE by performing a spur detection procedure on a frequency-domain noise signal;
estimate a frequency associated with the one or more frequency spurs based at least in part on the spur detection procedure; and
transmit the information indicating the one or more spur parameters based at least in part on the spur detection procedure and the frequency.

13. A method for wireless communications at a user equipment (UE), comprising:
transmitting information indicating one or more spur parameters that correspond to one or more frequency spurs associated with the UE;
receiving, after transmission of the information, a control message indicating a rate matching pattern for one or more subsequent communications for the UE, wherein the rate matching pattern is based at least in part on the one or more spur parameters that correspond to the one or more frequency spurs associated with the UE; and
communicating one or more messages in accordance with the rate matching pattern for the UE.

14. The method of claim 13, further comprising:
detecting one or more additional frequency spurs associated with the UE;
transmitting second information indicating one or more second spur parameters that correspond to the one or more additional frequency spurs; and
receiving, after transmission of the second information, a second control message indicating an updated rate matching pattern for the one or more subsequent communications for the UE, wherein the updated rate matching pattern is based at least in part on the one or more second spur parameters.

15. The method of claim 14, wherein the second control message schedules one or more downlink messages in accordance with the updated rate matching pattern based at least in part on the one or more second spur parameters.

16. The method of claim 14, wherein the updated rate matching pattern is based at least in part on one or more modulation and coding scheme values associated with the one or more subsequent communications.

17. The method of claim 13, wherein transmitting the information comprises:
transmitting a report comprising channel state feedback and the information indicating the one or more spur parameters.

18. The method of claim 13, wherein transmitting the information comprises:
transmitting a bitmap corresponding to the information indicating the one or more spur parameters, wherein the bitmap indicates one or more component carriers associated with the one or more frequency spurs.

19. The method of claim 13, wherein the information indicates a bandwidth part index, a serving cell index, a frequency index, or any combination thereof associated with the one or more frequency spurs.

20. The method of claim 13, further comprising:
transmitting the information indicating the one or more spur parameters that correspond to the one or more frequency spurs, wherein the one or more frequency spurs are associated with one or more concurrent transmissions via a first frequency range and a second frequency range; and
receiving, after transmission of the information, downlink control information indicating the rate matching pattern, a puncturing pattern, or both for the one or more concurrent transmissions, wherein the rate matching pattern, the puncturing pattern, or both are based at least in part on the one or more spur parameters.

21. The method of claim 13, wherein the information comprises a frequency associated with the one or more frequency spurs, a location associated with the one or more frequency spurs, a type of the one or more frequency spurs, or any combination thereof, wherein the type indicates a static spur, a dynamic spur, or a lack of spurs.

22. The method of claim 13, wherein transmitting the information comprises:
transmitting a medium access control (MAC) control element (MAC-CE) indicating the one or more spur parameters.

23. The method of claim 13, further comprising:
receiving a MAC-CE that requests the information indicating the one or more spur parameters from the UE.

24. The method of claim 13, further comprising:
detecting the one or more frequency spurs associated with the UE by performing a spur detection procedure on a frequency-domain noise signal;
estimating a frequency associated with the one or more frequency spurs based at least in part on the spur detection procedure; and
transmitting the information indicating the one or more spur parameters based at least in part on the spur detection procedure and the frequency.

25. A non-transitory computer-readable medium storing code for wireless communications by a user equipment (UE), the code comprising instructions executable by one or more processors to:
transmit information indicating one or more spur parameters that correspond to one or more frequency spurs associated with the UE;
receive, after transmission of the information, a control message indicating a rate matching pattern for one or more subsequent communications for the UE, wherein the rate matching pattern is based at least in part on the one or more spur parameters that correspond to the one or more frequency spurs associated with the UE; and
communicate one or more messages in accordance with the rate matching pattern for the UE.

26. The non-transitory computer-readable medium of claim 25, wherein the instructions are further executable by the one or more processors to:
detect one or more additional frequency spurs associated with the UE;
transmit second information indicating one or more second spur parameters that correspond to the one or more additional frequency spurs; and
receive, after transmission of the second information, a second control message indicating an updated rate matching pattern for the one or more subsequent communications for the UE, wherein the updated rate matching pattern is based at least in part on the one or more second spur parameters.

27. The non-transitory computer-readable medium of claim 26, wherein the second control message schedules one or more downlink messages in accordance with the updated rate matching pattern based at least in part on the one or more second spur parameters.

28. The non-transitory computer-readable medium of claim 26, wherein the updated rate matching pattern is based at least in part on one or more modulation and coding scheme values associated with the one or more subsequent communications.

29. The non-transitory computer-readable medium of claim 25, wherein the instructions to transmit the information are executable by the one or more processors to:
    transmit a report comprising channel state feedback and the information indicating the one or more spur parameters.

30. The non-transitory computer-readable medium of claim 25, wherein the instructions to transmit the information are executable by the one or more processors to:
    transmit a bitmap corresponding to the information indicating the one or more spur parameters, wherein the bitmap indicates one or more component carriers associated with the one or more frequency spurs.

* * * * *